(12) United States Patent
Yan et al.

(10) Patent No.: US 12,182,368 B2
(45) Date of Patent: Dec. 31, 2024

(54) TOUCH LAYER AND TOUCH DISPLAY APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Jun Yan, Beijing (CN); Jianghua Liu, Beijing (CN); Zhiliang Jiang, Beijing (CN); Erjin Zhao, Beijing (CN); Lingran Wang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/015,211

(22) PCT Filed: Nov. 24, 2021

(86) PCT No.: PCT/CN2021/132885
§ 371 (c)(1),
(2) Date: Jan. 9, 2023

(87) PCT Pub. No.: WO2023/092348
PCT Pub. Date: Jun. 1, 2023

(65) Prior Publication Data
US 2024/0241608 A1 Jul. 18, 2024

(51) Int. Cl.
*G06F 3/044* (2006.01)
*G06F 3/041* (2006.01)

(52) U.S. Cl.
CPC ........ *G06F 3/0443* (2019.05); *G06F 3/04164* (2019.05); *G06F 2203/04112* (2013.01)

(58) Field of Classification Search
CPC ....... G06F 2203/04112; G06F 3/04164; G06F 3/0443; G06F 3/0445
See application file for complete search history.

(56) References Cited

U.S. PATENT DOCUMENTS

2012/0212449 A1 8/2012 Kuriki
2014/0111709 A1 4/2014 Kim et al.
(Continued)

FOREIGN PATENT DOCUMENTS

CN 111176488 A 5/2020
TW 201546695 A 12/2015

OTHER PUBLICATIONS

PCT International Search Report (w/ English Translation) and Written Opinion for corresponding PCT Application No. PCT/CN2021/132885, mailed Jul. 27, 2022, 10 pages.

*Primary Examiner* — Abbas I Abdulselam
(74) *Attorney, Agent, or Firm* — Dority & Manning, P.A.

(57) ABSTRACT

A touch layer includes an effective touch structure and a plurality of virtual touch portions. The effective touch structure includes a plurality of first touch bars extending substantially in a same direction, and a plurality of second touch bars extending substantially in a same direction; the plurality of first touch bars cross and are insulated from the plurality of second touch bars; the effective touch structure has a plurality of dummy regions that are non-overlapping with, in a thickness direction of the touch layer, both the plurality of first touch bars and the plurality of second touch bars; in the plurality of virtual touch portions, each virtual touch portion is insulated from both the plurality of first touch bars and the plurality of second touch bars, and at least one virtual touch portion is located in a dummy region.

20 Claims, 16 Drawing Sheets

(56) References Cited

U.S. PATENT DOCUMENTS

| | | |
|---|---|---|
| 2014/0160372 A1 | 6/2014 | Li et al. |
| 2015/0060256 A1* | 3/2015 | Kim .................... G06F 3/0446 |
| | | 200/600 |
| 2018/0032188 A1 | 2/2018 | Park et al. |
| 2018/0052553 A1 | 2/2018 | Wang et al. |
| 2018/0190723 A1 | 7/2018 | Han et al. |
| 2018/0300007 A1 | 10/2018 | Xu et al. |
| 2019/0073071 A1 | 3/2019 | Ryu et al. |
| 2020/0295092 A1 | 9/2020 | Moon et al. |
| 2020/0303467 A1 | 9/2020 | Feng |
| 2021/0191546 A1 | 6/2021 | Zhang et al. |
| 2022/0404933 A1 | 12/2022 | Pang et al. |

* cited by examiner

TOUCH LAYER AND TOUCH DISPLAY APPARATUS

CROSS-REFERENCE TO RELATED APPLICATION

This application is a national phase entry under 35 USC 371 of International Patent Application No. PCT/CN2021/132885, filed on Nov. 24, 2021, which is incorporated herein by reference in its entirety.

TECHNICAL FIELD

The present disclosure relates to the field of display technologies, and in particular, to a touch layer and a touch display apparatus.

BACKGROUND

Since rise of touch technologies, due to their characteristics of simplicity, rapidness, humanization and the like, the touch technologies have become more and more popular, and there are more and more products with a touch function in the market, such as mobile phones, tablet computers and notebook computers.

According to induction principles, the touch technologies may be classified into a resistive touch technology, a capacitive touch technology, a surface acoustic wave touch technology and an optical touch technology. Touch apparatuses to which the capacitive touch technology is applied have broad development prospects due to advantages of high durability, long service life, support for multi-touch and the like.

SUMMARY

In an aspect, a touch layer is provided. The touch layer includes an effective touch structure and a plurality of virtual touch portions. The effective touch structure includes a plurality of first touch bars extending substantially in a same direction, and a plurality of second touch bars extending substantially in a same direction. The plurality of first touch bars cross and are insulated from the plurality of second touch bars; the effective touch structure has a plurality of dummy regions that are non-overlapping with, in a thickness direction of the touch layer, both the plurality of first touch bars and the plurality of second touch bars. In the plurality of virtual touch portions, each virtual touch portion is insulated from both the plurality of first touch bars and the plurality of second touch bars, and at least one virtual touch portion is located in a dummy region.

In some embodiments, in the thickness direction of the touch layer, the plurality of first touch bars cross the plurality of second touch bars to create a plurality of square regions; a square region is the dummy region; the plurality of virtual touch portions include a plurality of first virtual touch portions, and at least one first virtual touch portion is located in the square region.

In some embodiments, in a direction perpendicular to an extending direction of a first touch bar, a maximum dimension of the first touch bar is a first width, and an average value of dimensions of portions of a first virtual touch portion of the plurality of first virtual touch portions is a first average width; the first average width is greater than the first width.

In some embodiments, the square region includes a main region and at least one extending region; each extending region extends from the main region into a first touch bar or a second touch bar. The square region is provided with a single first virtual touch portion, and the single first virtual touch portion is located in the main region and extends into the at least one extending region; alternatively, the square region is provided with first virtual touch portions, that are insulated from one another, of the plurality of first virtual touch portions, at least one of the first virtual touch portions of the plurality of first virtual touch portions is located in the main region, and each of the rest of the first virtual touch portions is located in an extending region.

In some embodiments, each first virtual touch portion disposed in the square region is axial symmetric with respect to an axis extending in an extending direction of a first touch bar and/or an axis extending in an extending direction of a second touch bar.

In some embodiments, a first touch bar includes a plurality of first touch electrodes and a plurality of first coupling portions that are alternately arranged and coupled to one another. A second touch bar includes a plurality of second touch electrodes and a plurality of second coupling portions that are alternately arranged and coupled to one another. At a position where the first touch bar and the second touch bar cross each other in the thickness direction of the touch layer, a first coupling portion of the first touch bar and a second coupling portion of the second touch bar have an overlapping region therebetween.

In some embodiments, a virtual touch portion and the plurality of first touch electrodes are disposed in a same layer; and/or another virtual touch portion and the plurality of second touch electrodes are disposed in a same layer.

In some embodiments, a first touch bar is provided with at least one first opening region therein, and a first opening region is the dummy region; the plurality of virtual touch portions include a plurality of second virtual touch portions, and a second virtual touch portion is located in the first opening region.

In some embodiments, the first touch bar includes a plurality of first touch electrodes and a plurality of first coupling portions; the first opening region is located inside a first touch electrode.

In some embodiments, the first touch electrode is provided with a single first opening region therein; or the first touch electrode is provided with at least two first opening regions therein, and the at least two first opening regions are arranged in a direction perpendicular to an extending direction of the first touch bar.

In some embodiments, the first touch electrode is symmetric with respect to an axis extending in an extending direction of the first touch bar.

In some embodiments, an area of the second virtual touch portion is ⅓ to ½ of an area of the first touch electrode.

In some embodiments, a second touch bar is provided with at least one second opening region therein, and a second opening region is the dummy region; the plurality of virtual touch portions include a plurality of third virtual touch portions, and a third virtual touch portion is located in the second opening region.

In some embodiments, a contour of the dummy region and a contour of each virtual touch portion in the dummy region have a gap therebetween, and a width of the gap is not less than 4.5 μm and not greater than 6.5 μm.

In some embodiments, the plurality of first touch bars are divided into a plurality of first touch groups, and at least two first touch bars included in a first touch group are configured to simultaneously receive a first touch signal. The plurality of second touch bars are divided into a plurality of second touch groups, and at least two second touch bars included in a second touch group are configured to simultaneously receive a second touch signal.

In some embodiments, the touch layer is divided into a plurality of touch units, and a touch unit is a smallest repeating unit covering all crossing positions between the first touch group and the second touch group; a portion, located in the touch unit, of each first touch bar of the first touch group is a single first touch section; a portion, located in the touch unit, of each second touch bar of the second touch group is a single second touch section. The effective touch structure further includes at least one first connection portion located in the touch unit, and each first connection portion is coupled to two adjacent first touch sections in the touch unit; in the thickness direction of the touch layer, each first connection portion is non-overlapping with all second touch sections in the touch unit.

In some embodiments, a first connection portion located in the touch unit is coupled to ends of two adjacent first touch sections; or the effective touch structure includes a plurality of first connection portions located in the touch unit, and a first connection portion is located between two adjacent second touch sections; in an extending direction of a first touch section, the plurality of first connection portions are respectively arranged on two sides of a second touch section; in an extending direction of a second touch section, the plurality of first connection portions are respectively arranged on two sides of a first touch section.

In some embodiments, an average value of dimensions, in a direction perpendicular to an extending direction of a first touch bar of the first touch group, of portions of the first touch bar of the first touch group is a second average width; an average value of dimensions, in the extending direction of the first touch bar of the first touch group, of portions of a first connection portion coupled to the first touch bar of the first touch group is a third average width; the third average width is not greater than ⅕ of the second average width.

In some embodiments, the effective touch structure further includes at least one second connection portion, and a second connection portion is coupled to two adjacent second touch sections in the second touch group; in the thickness direction of the touch layer, each second connection portion is non-overlapping with all first touch sections in the touch unit.

In some embodiments, in the touch unit, a total area of all virtual touch portions is 35% to 45% of an area of the touch unit.

In some embodiments, a first touch bar is a metal mesh constituted by a plurality of first metal lines, and a second touch bar is a metal mesh constituted by a plurality of second metal lines. A first metal line is perpendicular to a second metal line at a crossing position between the first touch bar and the second touch bar.

In some embodiments, the first metal line includes a first line segment, a second line segment and a first connection line segment that are disposed in a same layer, the first line segment and the second line segment are each substantially extend in an extending direction of the first metal line and are not located on a straight line, and two ends of the first connection line segment are respectively in contact with the first line segment and the second line segment. The second metal line includes a third line segment, a fourth line segment and a second connection line segment that are disposed in a same layer, the third line segment and the fourth line segment are each substantially extend in an extending direction of the second metal line and are not located on a straight line, and two ends of the second connection line segment are respectively in contact with the third line segment and the fourth line segment; the first metal line and the second metal line are located in different layers; at the crossing position, the first line segment crosses and is perpendicular to the fourth line segment, or the first line segment crosses and is perpendicular to the third line segment.

In some embodiments, the first touch bar includes a plurality of first touch electrodes and a plurality of first coupling portions that are alternately arranged and coupled to one another. A first coupling portion includes at least one coupling sub-portion, and a coupling sub-portion is coupled to two adjacent first touch electrodes. The coupling sub-portion is in a shape of "W", and the coupling sub-portion and the second touch bar have two crossing positions therebetween.

In another aspect, a touch display apparatus is provided. The touch display apparatus includes a display panel and the touch layer that is as described in any one of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
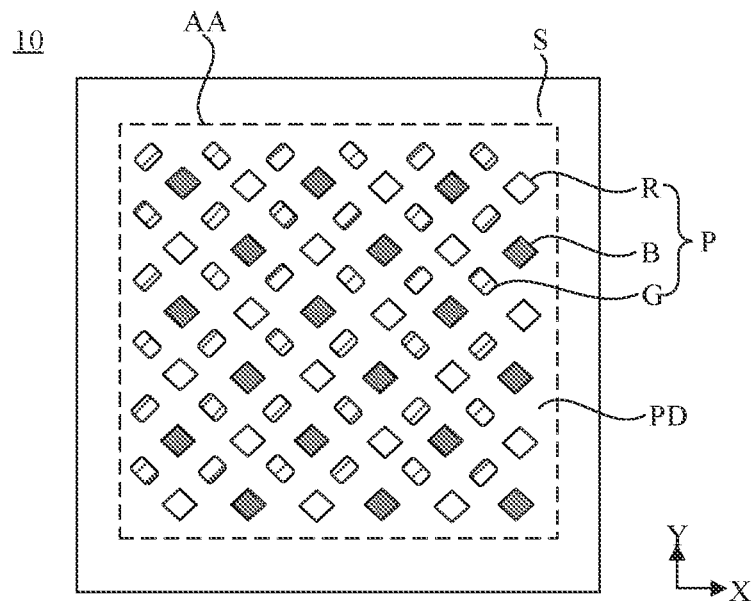
FIG. 1 is a structural diagram of a display panel, in accordance with some embodiments of the present disclosure.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of" or "the plurality of" means two or more unless otherwise specified.

In the description of some embodiments, the terms such as "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "A and/or B" includes the following three combinations: only A, only B, and a combination of A and B.

The phrase "applicable to" or "configured to" as used herein indicates an open and inclusive expression, which does not exclude devices that are applicable to or configured to perform additional tasks or steps.

As used herein, the term such as "about", "substantially" or "approximately" includes a stated value and an average value within an acceptable range of deviation of a particular value. The acceptable range of deviation is determined by a person of ordinary skill in the art in view of measurement in question and errors associated with measurement of a particular quantity (i.e., limitations of a measurement system).

As used herein, the term such as "parallel", "perpendicular" or "equal" includes a stated condition and a condition similar to the stated condition, a range of the similar condition is within an acceptable range of deviation, and the acceptable range of deviation is determined by a person of ordinary skill in the art, considering measurement in question and errors associated with measurement of a particular quantity (i.e., limitations of a measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°. The term "equal" includes absolute equality and approximate equality, and an acceptable range of deviation of the approximate equality may be that, for example, a difference between the two that are equal is less than or equal to 5% of either of the two.

Exemplary embodiments are described herein with reference to sectional views and/or plan views as idealized exemplary drawings. In the accompanying drawings, thicknesses of layers and sizes of regions are enlarged for clarity. Thus, variations in shape relative to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. Therefore, the regions shown in the accompanying drawings are schematic in nature, and their shapes are not intended to show actual shapes of regions in a device, and are not intended to limit the scope of the exemplary embodiments.

A touch display apparatus includes a display panel that is configured to achieve image display, the display panel includes a plurality of pixel driving circuits, and the pixel driving circuit is provided with a storage capacitor therein. In a thickness direction of the touch display apparatus, there is a large parasitic capacitance between a touch electrode and a plate (e.g., a cathode plate) of the storage capacitor that have an overlapping region therebetween, which causes resistance-capacitance (RC) loading of the touch electrode to be relatively large, and results in a problem that a degree of signal attenuation is excessive. As a result, a development trend of the touch display apparatus towards being large-sized is limited. Moreover, the relatively large RC loading makes it difficult to achieve improvements of performance parameters of coding frequency, reporting rate, touch sensitivity and the like, so that user's requirements for touch performance can not be satisfied.

In order to solve the above problems, some embodiments of the present disclosure provide a touch display apparatus having both a touch function and an image display function, and the touch display apparatus may include, but is not limited to, a display, a television, a billboard, and a laser printer, a household appliance, a large-area wall and an information inquiry device (e.g., a business inquiry device for a department of e-government, bank, hospital, electricity or the like) that all having a display function, a mobile phone, a personal digital assistant (PDA), a digital camera, a portable camcorder, and a navigator. An application of the touch display apparatus is not limited in the embodiments of the present disclosure. In addition, the touch display apparatus may be a flexible touch display apparatus that is rollable or bendable, or may be a rigid touch display apparatus that is in a shape of a flat plate.

For example, the touch display apparatus includes a touch layer (also referred to as a touch screen, a touch structure or a touch panel), and the touch layer is used for sensing a touch position to achieve touch control. The touch display apparatus further includes a display panel used for image display, and an image displayed on the display apparatus may be controlled according to the sensed touch position, thereby achieving a human-computer interaction.

For example, referring to FIG. 1, the display panel 10 has a display area AA and a peripheral area S. The peripheral area S is located on at least one side of the display area AA. For example, the peripheral area S may surround the display area AA. For example, the display area AA includes a pixel definition region PD and a plurality of sub-pixel regions P defined by the pixel definition region PD. An arrangement manner of the plurality of sub-pixel regions P in the display area AA is not limited. For example, the arrangement manner of the plurality of sub-pixel regions P may be any one of a standard RGB (SRGB) arrangement, a Diamond arrangement, a Pentile arrangement and a Delta arrangement. The plurality of sub-pixel regions P may include sub-pixel regions of a first color, sub-pixel regions of a second color and sub-pixel regions of a third color. The first color, the second color and the third color may be three primary colors, i.e., a red color, a green color and a blue color, which is not limited thereto. FIG. 1 shows an example where the arrangement manner of the plurality of sub-pixel regions P is the Diamond arrangement, the sub-pixel regions of the first color are red sub-pixel regions R, the sub-pixel regions of the second color are green sub-pixel regions G, and the sub-pixel regions of the third color are blue sub-pixel regions B. For example, a shape of each sub-pixel region P may be designed according to the arrangement manner of the sub-pixel regions, which is not limited.

For example, the display panel 10 may be a liquid crystal display (LCD) panel, or may be a self-luminescent display panel, which may be, for example, an organic light emitting diode (OLED) display panel, a quantum dot light emitting diodes (QLED) display panel, or a tiny light-emitting diode (e.g., a Mini LED or a Micro LED) display panel. In a case where the display panel 10 in the touch display apparatus is the liquid crystal display panel, the touch display apparatus is a liquid crystal touch display apparatus; in a case where the display panel 10 in the touch display apparatus is the self-luminescent display panel, the touch display apparatus is a self-luminescent touch display apparatus.

Figure 2A:
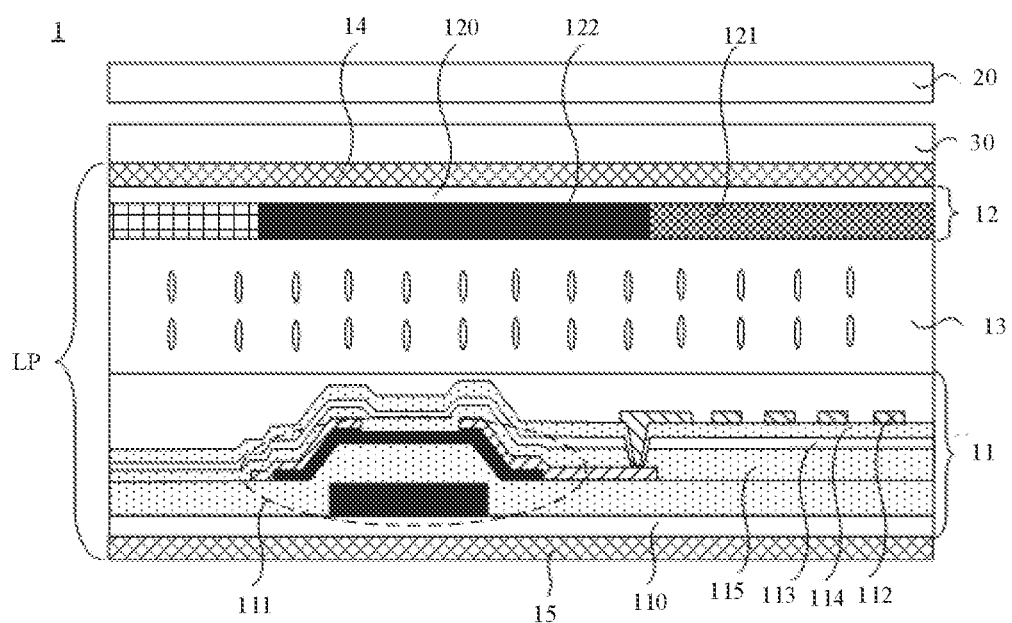
FIG. 2A is a structural diagram of a touch display apparatus, in accordance with some embodiments of the present disclosure.
Figure 2B:
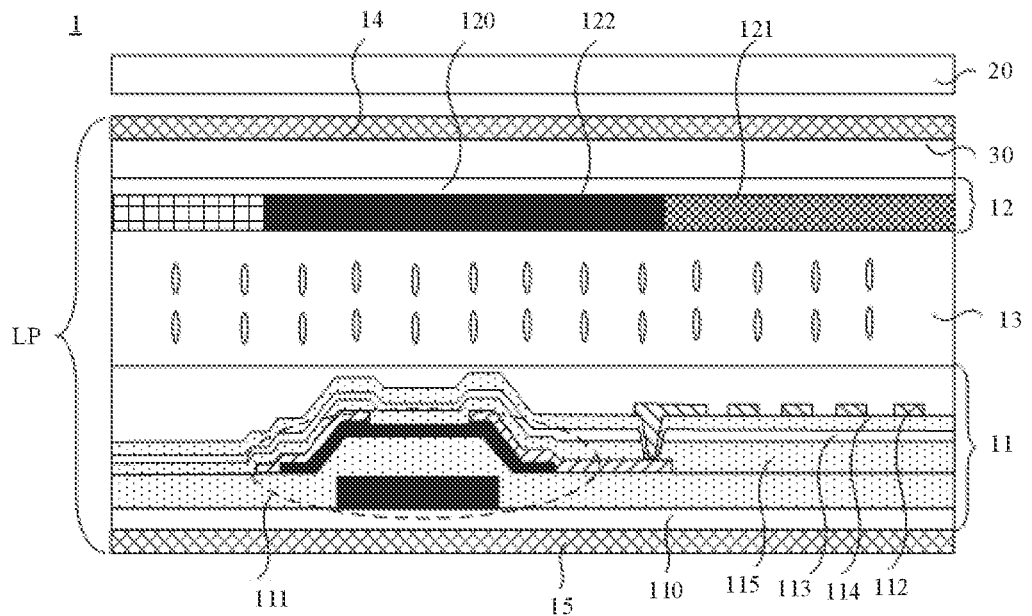
FIG. 2B is a structural diagram of a touch display apparatus, in accordance with other embodiments of the present disclosure.
Figure 2C:
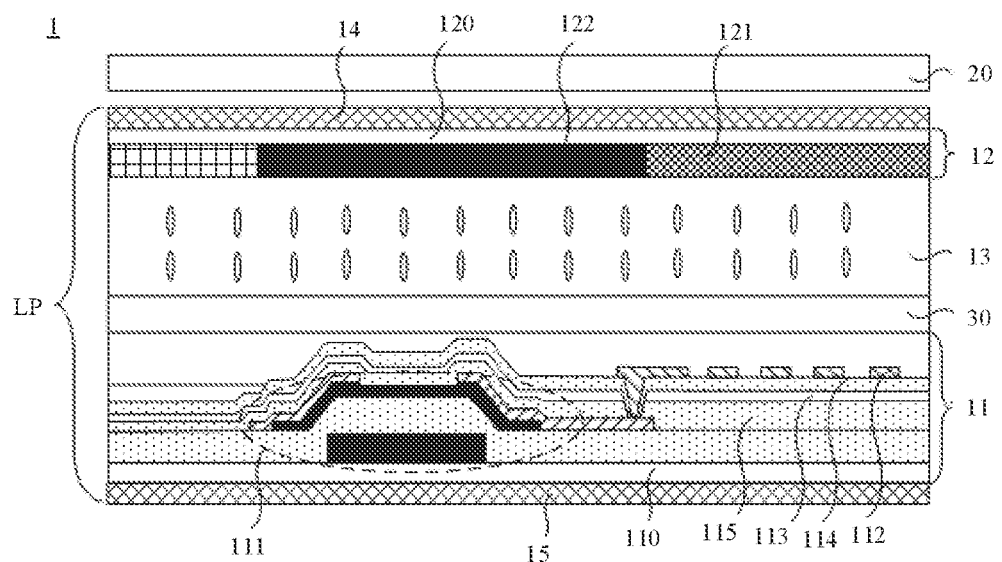
FIG. 2C is a structural diagram of a touch display apparatus, in accordance with yet other embodiments of the present disclosure.

As shown in FIGS. 2A, 2B and 2C, in the case where the touch display apparatus 1 is the liquid crystal touch display apparatus, the liquid crystal touch display apparatus includes a cover glass 20, a touch layer 30, a liquid crystal display panel LP and a backlight module (not shown in the figures). The backlight module is used for providing backlight for the liquid crystal display panel LP. A main structure of the liquid crystal display panel LP includes an array substrate 11, an opposite substrate 12 and a liquid crystal layer 13 disposed between the array substrate 11 and the opposite substrate 12.

As shown in FIGS. 2A, 2B and 2C, each sub-pixel region is provided with a thin film transistor 111 and a pixel electrode 112 that are located on a first substrate 110 therein. As shown in FIG. 2A, the array substrate 11 includes a common electrode 113 provided on the first substrate 110. The pixel electrode 112 and the common electrode 113 may be disposed in a same layer, or may be disposed in different layers. In a case where the pixel electrode 112 and the common electrode 113 are disposed in different layers, as shown in FIG. 2A, a first insulating layer 114 is provided between the pixel electrode 112 and the common electrode 113. In a case where the common electrode 113 is disposed between the transistor 111 and the pixel electrode 112, as shown in FIG. 2A, a second insulating layer 115 is provided between the common electrode 113 and the transistor 111. In some other embodiments, the opposite substrate 12 includes a common electrode provided on a second substrate.

As shown in FIGS. 2A, 2B and 2C, the opposite substrate 12 includes a second substrate 120 and a color filter layer 121 disposed on the second substrate 120. In this case, the opposite substrate 12 may also be referred to as a color filter (CF) substrate. The color filter layer 121 includes at least red photoresist units located in the red sub-pixel regions, green photoresist units located in the green sub-pixel regions and blue photoresist units located in the blue sub-pixel regions. The opposite substrate 12 further includes black matrix patterns 122 disposed on the second substrate 120, and the black matrix patterns 122 are used for separating the red photoresist units, the green photoresist units and the blue photoresist units.

As shown in FIGS. 2A, 2B and 2C, the liquid crystal display panel LP further includes an upper polarizer 14 disposed on a side of the opposite substrate 12 away from the liquid crystal layer 13 and a lower polarizer 15 disposed on a side of the array substrate 11 away from the liquid crystal layer 13.

In some embodiments, as shown in FIG. 2A, the touch layer 30 is disposed outside the liquid crystal display panel LP. That is, the touch layer 30 is disposed between the cover glass 20 and the upper polarizer 14. In this case, the touch display apparatus is referred to as an out-cell touch display apparatus; in this case, the upper polarizer 14 also serves as a base layer of the touch layer 30, and the base layer is configured to carry the touch layer 30. In some other embodiments, as shown in FIGS. 2B and 2C, the touch layer 30 is disposed in the liquid crystal display panel LP. In this case, the touch display apparatus is referred to as an in-cell touch display apparatus. In a case where the touch layer 30 is disposed in the liquid crystal display panel LP, it may be as shown in FIG. 2B that the touch layer 30 is disposed between the upper polarizer 14 and the opposite substrate 12. In this case, the touch display apparatus is referred to as an on-cell touch display apparatus; in this case, the opposite substrate 12 also serves as the base layer of the touch layer 30. Alternatively, it may be as shown in FIG. 2C that the touch layer 30 is disposed between the first substrate 110 and the second substrate 120. For example, the touch layer 30 is disposed on the first substrate 110. In this case, the touch display apparatus is referred to as an in-cell touch display apparatus; in this case, the array substrate 11 also serves as the base layer of the touch layer 30.

Figure 3A:
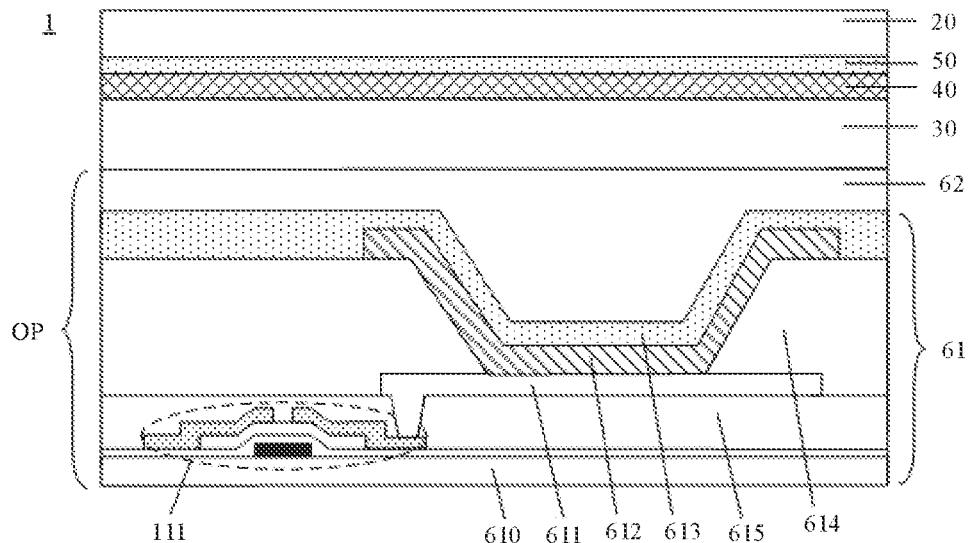
FIG. 3A is a structural diagram of a touch display apparatus, in accordance with yet other embodiments of the present disclosure.
Figure 3B:
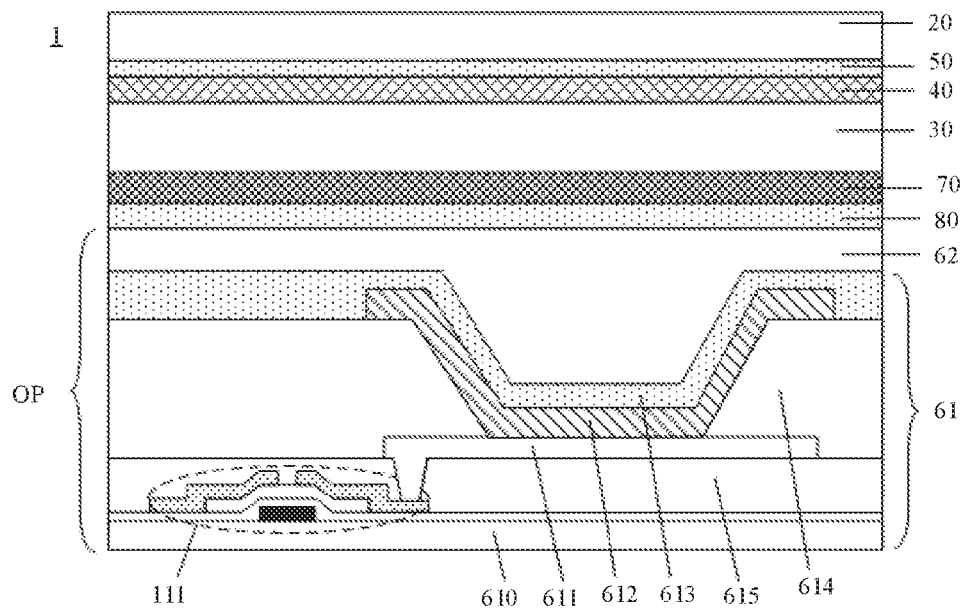
FIG. 3B is a structural diagram of a touch display apparatus, in accordance with yet other embodiments of the present disclosure.

In a case where the touch display apparatus 1 is the self-luminescent display apparatus, as shown in FIGS. 3A and 3B, a main structure of the self-luminescent display apparatus includes a self-luminescent display panel OP, a touch layer 30, a polarizer 40, a first optically clear adhesive (OCA) 50 and a cover glass 20 that are arranged in sequence.

The self-luminescent display panel OP includes a display substrate 61 and an encapsulation layer 62 used for encapsulating the display substrate 61. Here, the encapsulation layer 62 may be an encapsulation film or an encapsulation substrate.

As shown in FIGS. 3A and 3B, each sub-pixel region of the display substrate 61 is provided with a light-emitting device and a pixel driving circuit that are disposed on a third substrate 610 therein, and the pixel driving circuit includes a plurality of transistors 111. The light-emitting device includes a first electrode 611, a light-emitting functional layer 612 and a second electrode 613, and the first electrode 611 is electrically connected to a drain of a transistor 111 serving as a driving transistor. The display substrate 61 further includes a pixel definition layer (PDL) 614, the pixel definition layer 614 includes a plurality of opening regions, and a light-emitting device is disposed in an opening region.

In some embodiments, the light-emitting functional layer 612 includes a light-emitting layer. In some other embodiments, in addition to the light-emitting layer, the light-emitting functional layer 612 further includes one or more of an electron transporting layer (ETL), an electron injection layer (EIL), a hole transporting layer (HTL) and a hole injection layer (HIL).

As shown in FIG. 3A, the display substrate 61 further includes a planarization layer 615 disposed between the transistor 111 and the first electrode 611.

In some embodiments, as shown in FIG. 3A, the touch layer 30 is directly disposed on the encapsulation layer 62. That is, there is no film layer provided between the touch layer 30 and the encapsulation layer 62, and the encapsulation layer 62 also serves as the base layer of the touch layer 30. In this case, a thickness of the touch display apparatus 1 is relatively small, which is conducive to achieve the touch display apparatus having a light weight and a small thinness. In some other embodiments, as shown in FIG. 3B, the touch layer 30 is disposed on a substrate 70, the substrate 70 is adhered to the encapsulation layer 62 by a second optically clear adhesive 80, and the substrate 70 also serves as the base layer of the touch layer 30.

In an application of a capacitive touch technology, a plurality of film layer structures used for achieving touch sensing may be arranged in a stack to form a touch layer, and the touch layer includes a plurality of touch electrodes. The capacitive touch technology may be classified into a self-capacitance touch technology, a mutual-capacitance touch technology, etc. In a case where the self-capacitance touch technology is applied to the touch layer, a capacitance (i.e., a self-capacitance) is created between a touch electrode and the ground. When a finger touches the touch display apparatus, a capacitance will be superimposed on the touch electrode, so that the capacitance created between the touch electrode and the ground is changed. Coordinates of a touch point may be determined according to changing amount of, before and after the touch, of the capacitance created between the ground and the plurality of touch electrodes, so that the touch sensing is achieved. In a case where the mutual-capacitance touch technology is applied to the touch layer, the plurality of touch electrodes may be divided into touch driving electrodes and touch sensing electrodes. The touch driving electrodes may be each configured to transmit a touch driving signal, and the touch sensing electrodes may be each configured to transmit a touch sensing signal, so that stable capacitances are created between the touch driving electrodes and the touch sensing electrodes. When a finger touches the touch display apparatus, it may be possible to affect the coupling between a touch driving electrode and a touch sensing electrode that are near a touch position, so that a capacitance between the two touch electrodes is changed. Similarly, coordinates of the touch point may be determined according to the changing amount of, before and after the touch, of the capacitance created between the touch driving electrode and the touch sensing electrode.

For the convenience of the description, the solutions of the embodiments of the present disclosure are described below by taking an example where the mutual-capacitance touch technology is applied to the touch display apparatus, the touch layer is disposed on a light exit side of the display panel, and a film layer, that is closest to the touch layer, in the display panel also serves as the base layer of the touch layer.

Figure 4:
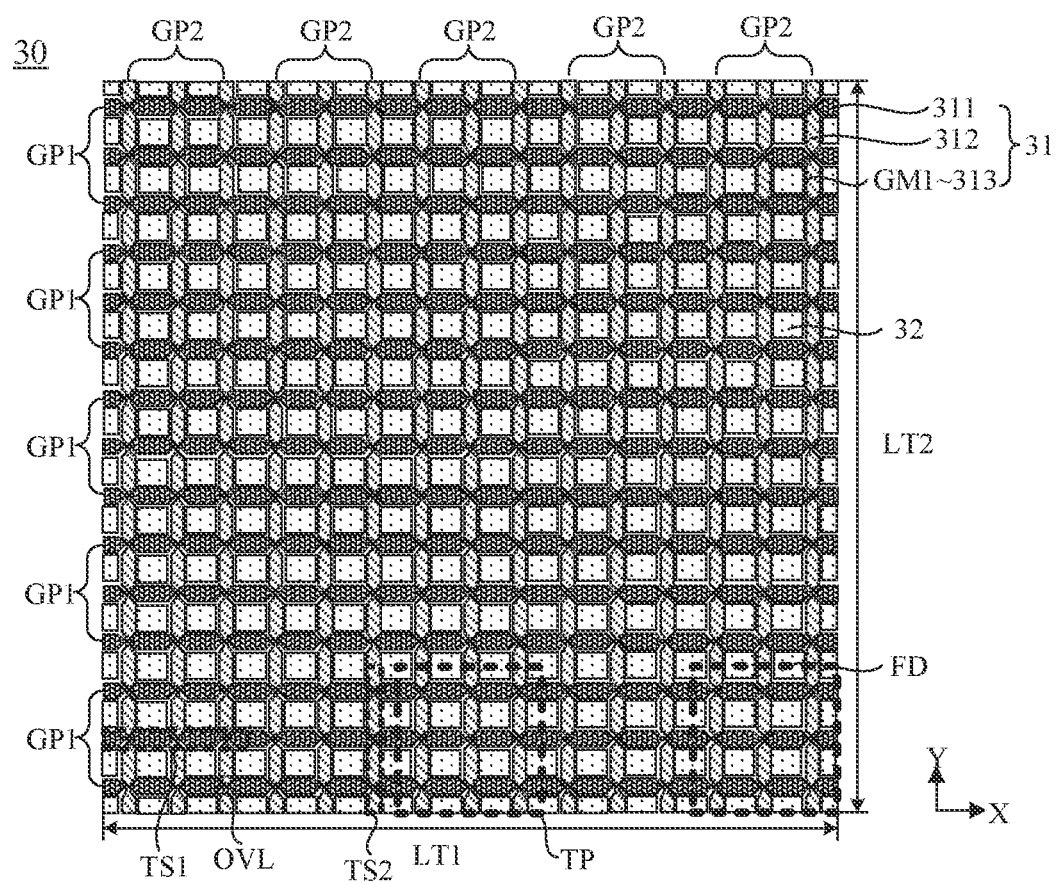
FIG. 4 is a structural diagram of a touch layer, in accordance with some embodiments of the present disclosure.

Some other embodiments of the present disclosure provide a touch layer. The touch layer may be applied to the above touch display apparatus or other touch apparatuses, which is not limited. Referring to FIG. 4, the touch layer 30 includes an effective touch structure 31. The effective touch structure 31 includes a plurality of first touch bars 311 extending substantially in a same direction and a plurality of second touch bars 312 extending substantially in a same direction, and the plurality of first touch bars 311 cross and are insulated from the plurality of second touch bars 312. The extending direction of the first touch bar 311 is an extending direction of a line connecting a starting point and an ending point of the first touch bar 311, and the extending direction of the second touch bar 312 has the same meaning; the extending direction of the first touch bar 311 is different from the extending direction of the second touch bar 312. The plurality of first touch bars 311 are disposed in a same layer, and the plurality of second touch bars 312 are disposed in a same layer. A relationship between the layer where the plurality of first touch bars 311 are disposed and the layer where the plurality of second touch bars 312 are disposed will be described in detail later. For example, referring to FIG. 4, the first touch bar 311 extends in an direction X, and the plurality of first touch bars 311 are arranged in a direction Y; the second touch bar 312 extends in the direction Y, and the plurality of second touch bars 312 are arranged in the direction X; the extending direction of the first touch bar 311 is perpendicular to the extending direction of the second touch bar 312, and any one of the first touch bars 311 and any one of the second touch bars 312 are not in contact with each other and are insulated from each other. The first touch bar 311 may serve as the touch sensing electrode, and the second touch bar 312 may serve as the touch driving electrode; alternatively, the first touch bar 311 may serve as the touch driving electrode, and the second touch bar 312 may serve as the touch sensing electrode, which is not limited. The following examples are descripted by taking an example in which the first touch bar 311 serves as the touch sensing electrode, and the second touch bar 312 serves as the touch driving electrode.

Figure 5:
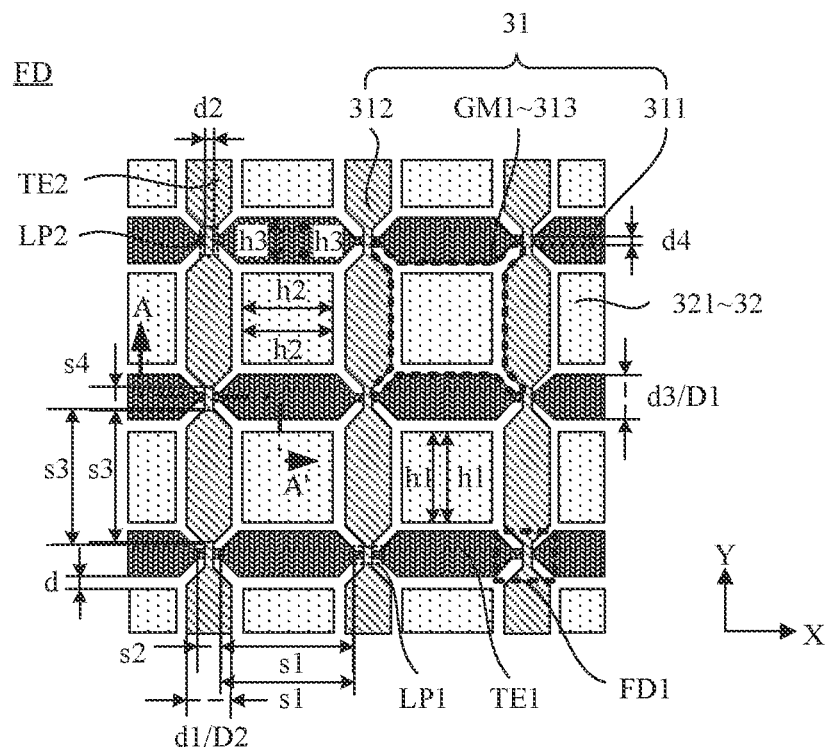
FIG. 5 is an enlargement view of the FD region in FIG. 4.

For example, referring to FIGS. 4 and 5, the effective touch structure 31 has a plurality of dummy regions 313 that are non-overlapping with, in a thickness direction of the touch layer 30, both the plurality of first touch bars 311 and the plurality of second touch bars 312. That is, in an orthographic projection of the effective touch structure 31 on the base layer, there are a plurality of regions each corresponding to none of the first touch bars 311 and the second touch bars 312, and each region corresponds to a dummy region 313 of the effective touch structure 31. A shape of the dummy region 313 may be only defined by the first touch bars 311 or the second touch bars 312, or may be jointly defined by at least one first touch bar 311 (e.g., two first touch bars) and at least one second touch bar 312 (e.g., two second touch bars).

For example, referring to FIGS. 4 and 5, the touch layer 30 further includes a plurality of virtual touch portions 32, each virtual touch portion 32 is insulated from both the plurality of first touch bars 311 and the plurality of second touch bars 312, and at least one (e.g., each) virtual touch portion 32 is located in a dummy region 313. That is, each virtual touch portion 32 is not in contact with both the plurality of first touch bars 311 and the plurality of second touch bars 312, and a dummy region 313 may be provided with one or more virtual touch portions 32 therein, or may be provided with no virtual touch portion 32 therein. In a case where the dummy region 313 is provided with the virtual touch portion(s) 32 therein, there is a distance between a contour of the dummy region 313 and a contour of any virtual touch portion 32 disposed therein at every position. That is, each virtual touch portion 32 is spaced apart, at every position, from both first touch bars 311 and second touch bars 312 that are adjacent to the virtual touch portion 32.

Based on the above, referring to FIG. 5, the effective touch structure 31 has the plurality of dummy regions 313, and the dummy regions 313 are each provided with neither the first touch bar 311 nor the second touch bar 312 but virtual touch portion(s) 32 that are insulated from both the first touch bars 311 and the second touch bars 312. The virtual touch portion(s) 32 do not transmit any signal, so that no parasitic capacitance will be generated between the virtual touch portion(s) 32 and the plate of the storage capacitor of the display panel. Each virtual touch portion 32 is located in a dummy region 313, there is a distance between a contour of each virtual touch portion 32 and a contour of a respective dummy region 313 at every position, the contour of the respective dummy region 313 is determined by the first touch bar 311 and/or the second touch bar 312, so that each virtual touch portion 32 is spaced apart from the first touch bar 311 and/or the second touch bar 312 at every position. Thus, due to arrangements of the dummy regions 313 and the virtual touch portions 32, a distribution range of the first touch bars 311 and the second touch bars 312 is reduced, so that an area of an overlapping region between the first touch bars 311 and the second touch bars 312 as a whole and the plate of the storage capacitor of the display panel is reduced, and the parasitic capacitance is also reduced. Correspondingly, the effective touch structure 31 has relatively small RC loading, which is conducive to improving the coding frequency, the reporting rate, the touch sensitivity and other performance parameters, so that a touch effect is improved.

Specific materials respectively forming the effective touch structure 31 and the plurality of virtual touch portions 32 are not limited. For example, the effective touch structure 31 and the plurality of virtual touch portions 32 may be each made of a transparent conductive material such as indium tin oxide (ITO), indium zinc oxide (IZO), indium gallium oxide (IGO), gallium zinc oxide (GZO), zinc oxide (ZnO), indium (III) oxide ($In_2O_3$), aluminum zinc oxide (AZO) and carbon nanotubes. The effective touch structure 31 and the plurality of virtual touch portions 32 that are formed may be each in a shape of a plane.

Figure 6:
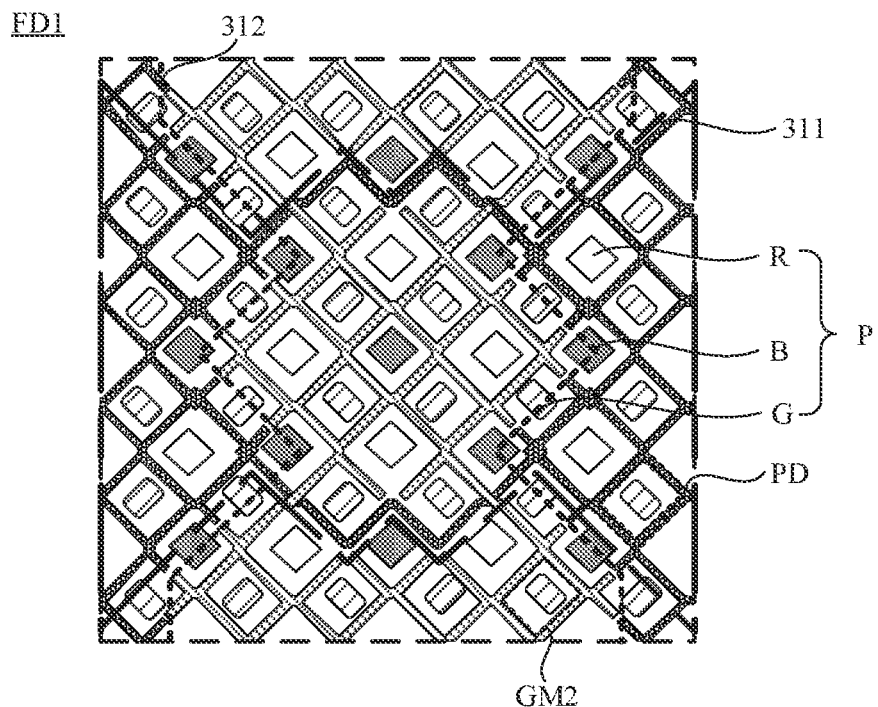
FIG. 6 is an enlargement view of the FD1 region in FIG. 5.

For another example, the effective touch structure 31 and the plurality of virtual touch portions 32 may be each made of an alloy such as magnesium-aluminum (Mg—Al) alloy or lithium-aluminum (Li—Al) alloy, or a material such as magnesium (Mg), aluminum (Al), lithium (Li), or silver (Ag); referring to FIG. 6, the plurality of first touch bars 311, the plurality of second touch bars 312 and the plurality of virtual touch portions 32 are each located in the pixel definition region PD and in a shape of a grid constituted by grid lines.

The grid lines each have a certain thickness, and side faces (e.g., surfaces that are not arranged in the thickness direction of the touch layer) of the formed grid lines are each generally a slope surface due to a limitation of a level of a current process. Thus, in a case where the touch display apparatus is viewed in a direction perpendicular to the side faces of the grid lines in an environment with a relatively high brightness, there is a visual risk of light reflected by the side faces of the grid lines. In a region where grid lines are arranged densely, the light will be reflected by the side faces of the grid lines, so that an intensity of the reflected light is relatively large. In a region where no grid line is arranged, the reflection of the light will not occur. Thus, there is a difference in an intensity of the reflected light between the region where the grid lines are arranged and the region where no grid line is arranged, and the difference in the intensity of the reflected light may be visually perceived by a user and is expressed as display mura, so that a display effect of the touch display apparatus will be affected. An angle between a direction in which the light is reflected by the side faces of the grid lines may be observed and a direction that is perpendicular to the reflective sides of the grid lines is referred to as a viewing angle.

In some examples, the plurality of first touch bars 311 and the plurality of second touch bars 312 (i.e., the effective touch structure 31) are each in the shape of the grid constituted by the grid lines. Therefore, in a bright environment, the light will be reflected by the effective touch structure 31, and in a portion, in the plurality of dummy regions 313 without the first touch bars 311 and the second touch bars 312, of the effective touch structure 31, the light will not be reflected. As a result, within the viewing angle, there will be a difference in the intensity of reflected light between the plurality of first touch bars 311 and the plurality of second touch bars 312, as a whole, of the effective touch structure 31 and the plurality of dummy regions 313, which may cause the display mura, so that user's experience is affected. In order to prevent the display mura from adversely affecting the display effect, as mentioned above, in the embodiments of the present disclosure, referring to FIG. 5, the plurality of virtual touch portions 32 are provided, each virtual touch portion 32 is located in a dummy region 313, and each virtual touch portion 32 has a same grid structure as the effective touch structure 31, and is able to reflect light similarly. As a result, the display mura caused by the difference in the intensity of the reflected light between the plurality of first touch bars 311 and the plurality of second touch bars 312 as a whole and the plurality of dummy regions 313 is avoided. In the embodiments of the present disclosure, the plurality of virtual touch portions 32 and the effective touch structure 31 are disposed in a same layer, thereby reducing a visual risk of each structure in the touch layer 30. As a result, it is conducive to improving the display effect. A specific manner in which the plurality of virtual touch portions 32 and the effective touch structure 31 are disposed in the same layer will be described in detail below, and will not be described here.

Specific shapes of the first touch bar 311 and the second touch bar 312 are not limited. For example, the shapes of the first touch bar 311 and the second touch bar 312 may be each a straight strip. In this case, two contour lines, of which extending directions are both in the direction X, of the first touch bar 311 are substantially parallel, and a width (i.e., a distance between the two contour lines) of each portion of the first touch bar 311 is approximately equal. Similarly, two contour lines, of which extending directions are both in the direction Y, of the second touch bar 312 are substantially parallel, and a width (i.e., a distance between the two contour lines) of each portion of the second touch bar 312 is also approximately equal.

For another example, with continued reference to FIG. 5, the shapes of the first touch bar 311 and the second touch bar 312 are each a strip but not a straight strip, at least one (e.g., each) first touch bar 311 includes a plurality of first touch electrodes TE1 and a plurality of first coupling portions LP1 that are alternately arranged and coupled to one another, and at least one (e.g., each) second touch bar 312 includes a plurality of second touch electrodes TE2 and a plurality of second coupling portions LP2 that are alternately arranged and coupled to one another. At a position where a first touch bar 311 and a second touch bar 312 cross each other in the thickness direction of the touch layer 30, a first coupling portion LP1 of the first touch bar 311 and a second coupling portion LP2 of the second touch bar 312 have an overlapping region therebetween. An orthographic projection of the first touch electrode TE1 on the base layer is non-overlapping with an orthographic projection of the second touch electrode TE2 on the base layer, and the first touch electrode TE1 is configured to create a capacitance with the second touch electrode TE2 to achieve the touch control. The first coupling portion LP1 is used for being coupled to two adjacent first touch electrodes TE1 in the extending direction (i.e., the direction X) of the first touch bar 311, the second coupling portion LP2 is used for being coupled to two adjacent second touch electrodes TE2 in the extending direction (i.e., the direction Y) of the second touch bar 312, and an orthographic projection of the first coupling portion LP1 on the display panel and an orthographic projection of the second coupling portion LP2 on the display panel have an overlapping region therebetween.

It is possible to make a distribution range of the plurality of first touch electrodes TE1 and the plurality of second touch electrodes TE2 as large as possible and a distribution range of the plurality of first coupling portions LP1 and the plurality of second coupling portions LP2 as small as possible, so as to reduce an area of the overlapping region between the first coupling portion LP1 and the second coupling portion LP2. As a result, a purpose of reducing the parasitic capacitance is achieved. The shape of the first touch electrode TE1 is different from a shape of the first coupling portion LP1, and/or a dimension of the first touch electrode TE1 is different from a dimension of the first coupling portion LP1; the dimension is an average dimension of dimensions in any one direction, i.e., an average value of distances between respective positions of the two contour lines extending in any one direction; the shape of the second touch electrode TE2 is different from a shape of the second coupling portion LP2, and/or a dimension of the second touch electrode TE2 is different from a dimension of the second coupling portion LP2. For example, referring to FIG. 5, contours of the first touch electrode TE1 and the second touch electrode TE2 are each substantially in a shape of a hexagon, and contours of the first coupling portion LP1 and the second coupling portion LP2 are each in a shape of a rectangle. In the direction X, an average length (i.e., an average value of lengths s1) of the first touch electrode TE1 is greater than an average length (i.e., an average value of lengths s2) of the first coupling portion LP1, and an average width (i.e., an average value of widths d1) of the second touch electrode TE2 is greater than an average width (i.e., an average value of widths d2) of the second coupling portion LP2; in the direction Y, an average width (i.e., an average value of widths d3) of the first touch electrode TE1 is greater than an average width (i.e., an average value of widths d4) of the first coupling portion LP1, and an average length (i.e., an average value of lengths s3) of the second touch electrode TE2 is greater than an average length (i.e., an average value of lengths s4) of the second coupling portion LP2. A maximum width of the first touch electrode TE1 and a maximum width of the second touch electrode TE2 may be each in a numerical range from 0.4 mm to 0.6 mm.

For the convenience of the description, the solutions of the embodiments of the present disclosure are continuously described below by taking an example where the first touch bar 311 includes the plurality of first touch electrodes TE1 and the plurality of first coupling portions LP1, and the second touch bar 312 includes the plurality of second touch electrodes TE2 and the plurality of second coupling portions LP2. It will be understood that, in a case where the shapes of the first touch bar 311 and the second touch bar 312 are each the straight strip, the following solutions are applicable and have the same beneficial effects, and details will not be repeated here.

In some embodiments, a virtual touch portion 32 and the plurality of first touch electrodes TE1 are disposed in a same layer; and/or another virtual touch portion 32 and the plurality of second touch electrodes TE2 are disposed in a same layer.

Figure 7:
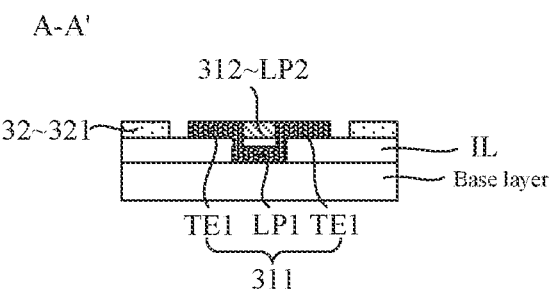
FIG. 7 is a sectional view of the FD region taken along the A-A' line in FIG. 5.

For example, in each second touch bar 312, the plurality of second touch electrodes TE2 and the plurality of second coupling portions LP2 are disposed in a same layer. Referring to FIG. 7, in each first touch bar 311, in order to enable the plurality of first touch electrodes TE1 to be coupled to one another while preventing the first touch bar 311 from being in direct contact with the second touch bar 312, the plurality of first touch electrodes TE1 and the plurality of first coupling portions LP1 that are coupled to one another may be disposed in different layers, and there is an insulating layer IL provided between the plurality of first touch electrodes TE1 and the plurality of first coupling portions LP1. In this case, the second touch bars 312 and the virtual touch portions 32 are all disposed in the same layer as the plurality of first touch electrodes TE1. In a same first touch bar 311, relative positions of first touch electrodes TE1 and first coupling portions LP1 are not limited. The first touch electrodes TE1 may be located on a side of the first coupling portions LP1 proximate to the base layer. In this case, two first touch electrodes TE1 adjacent in the direction X may be coupled in a bridging manner by at least one (e.g., one) first coupling portion LP1 or may be coupled to one first coupling portion LP1 through at least one via hole in the insulating layer IL. Specific arrangement manners of the bridging manner and the via hole(s) will be described later. Alternatively, referring to FIG. 7, the first touch electrode TE1 may be located on a side of the first coupling portion LP1 away from the base layer. In this case, each first touch electrode TE1 may be coupled to one first coupling portion LP1 through at least one via hole in the insulating layer IL. In a case where the relative position of the first touch electrode TE1 and the first coupling portion LP1 is as shown in FIG. 7, the plurality of first touch electrodes TE1 and the plurality of second touch electrodes TE2 that are used for achieving the touch control together are far away from the pixel driving circuits in the display panel that are used for controlling the image display, so that interferences of various electrical signals in the pixel driving circuits to the touch control may be reduced. As a result, it is conducive to improving an accuracy of the touch control and achieving a good touch effect. Similarly to the foregoing, with the above arrangement, the RC loading may be reduced. In addition, the plurality of virtual touch portions 32, the plurality of first touch electrodes TE1 and the plurality of second touch bars 312 are each in the shape of the grid and are disposed in the same layer as shown in FIG. 7, and the plurality of virtual touch portions 32 may fill in the dummy regions 313 in the effective touch structure 31, so that there are the grid lines in the dummy regions 313. As a result, it is possible to avoid the display mura. Moreover, the number and the total thickness of the film layers through which the respective reflected light emitted out from the touch display apparatus needs to pass are each equal, and a degree of attenuation of the intensity of the respective reflected light is equal, so that the visual risk may be further reduced.

Figure 8:
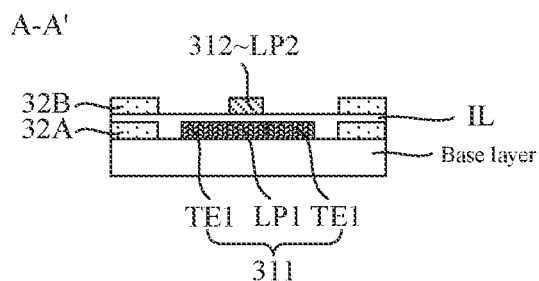
FIG. 8 is another sectional view of the FD region taken along the A-A' line in FIG. 5.

For another example, referring to FIGS. 5 and 8, in each first touch bar 311, the plurality of first touch electrodes TE1 and the plurality of first coupling portions LP1 are disposed in a same layer; in each second touch bar 312, the plurality of second touch electrodes TE2 and the plurality of second coupling portions LP2 are disposed in a same layer; in the effective touch structure 31, the plurality of first touch bars 311 and the plurality of second touch bars 312 are disposed in different layers, and there is an insulating layer IL provided between the plurality of first touch bars 311 and the plurality of second touch bars 312. In this case, the plurality of virtual touch portions 32 include a plurality of first-type virtual touch portions 32A and a plurality of second-type virtual touch portions 32B. Each first-type virtual touch portion 32A and the plurality of first touch electrodes TE1 are disposed in the same layer, and each second-type virtual touch portion 32B and the plurality of second touch electrodes TE2 are disposed in the same layer. Similarly to the foregoing, with the above arrangement, the RC loading may be reduced. Moreover, an area of the region where no grid line is arranged may be reduced to a greatest extent by providing the virtual touch portions 32, which may reduce the difference in the intensity of the reflected light between the region where the grid lines are arranged and the region where no grid line is arranged as much as possible, so that the display mura is avoided, and the visual risks of the reflective structures are reduced. In addition, in the thickness direction of the touch layer 30, the first-type virtual touch portions 32A substantially coincide with the second-type virtual touch portions 32B. Thus, in the first-type virtual touch portions 32A and the second-type virtual touch portions 32B that having a same grid structure, and the grid lines have substantially the same extending direction and the same viewing angle. As a result, additions of virtual touch portions 32 located in a same layer do not result in an addition of a new viewing angle, so that the visual risk is prevented from being increased.

For example, referring to FIG. 4, in the direction X, a length of each first touch bar 311 is LT1; in the direction Y, a length of each second touch bar 312 is LT2. In an example where LT2 is greater than LT1, the length of the second touch bar is great, which makes an overlapping region between the second touch bar and the plate of the storage capacitor of the display panel large, so that a large parasitic capacitance will be created. In order to prevent the parasitic capacitance from adversely affecting the touch effect, the plurality of second touch bars 312 may be disposed on a side of the plurality of first touch bars 311 away from the base layer, so as to increase a distance between each of the plurality of second touch bars 312 and the plate of the storage capacitor of the display panel. As a result, the purpose of reducing the parasitic capacitance is achieved, thereby reducing the RC loading of the effective touch structure 30. Similarly, in an example where LT2 is less than LT1 (LT2<LT1), the plurality of first touch bars 311 may be disposed on a side of the plurality of second touch bars 312 away from the base layer, which has beneficial effects the same as the above.

For example, referring to FIG. 5, a contour of at least one (e.g., each) dummy region 313 and a contour of each virtual touch portion 32 in the dummy region 313 have a gap therebetween, and a width d of the gap is not less than 4.5 µm. As for a virtual touch portion 32, in a case where a contour of the virtual touch portion 32 is separated from a contour of a dummy region 313 surrounding the virtual touch portion 32 by only part of the dummy region 313 rather than only other virtual touch portions 32, it is said that there is a gap between the virtual touch portion 32 and the dummy region 313, and a distance between the contour of the virtual touch portion 32 and the contour of the dummy region 313 is a width d of the gap. In order to avoid the display mura, a distance between the virtual touch portion 32 and the effective touch structure 31 shall be as small as possible without contacting each other. If the virtual touch portion 32 is in contact with the first touch bar 311 or the second touch bar 312, a coupling capacitance will be created between the virtual touch portion 32 and the plate of the storage capacitor of the display panel, which is not conducive to a reduction of the RC loading. If the virtual touch portion 32 is in contact with both the first touch bar 311 and the second touch bar 312, the first touch bar 311 and the second touch bar 312 that are in contact with the virtual touch portion 32 will be caused to be coupled. As a result, the touch sensing can not be achieved by the mutual capacitance.

On the above premise, with continued reference to FIG. 5, the contour of the at least one (e.g., each) dummy region 313 and the contour of each virtual touch portion 32 in the dummy region 313 have the gap therebetween, and the width d of the gap is not greater than 6.5 μm. That is, the distance (i.e., the width d of the gap) between the contour of the dummy region 313 and the contour of the virtual touch portion 32 located in the dummy region 313 is in a numerical range from 4.5 μm to 6.5 μm, and the difficulty of manufacturing the gap with the width d in the numerical range under the level of the current process is small, which is conducive to controlling the manufacturing costs. Moreover, a reliability of the manufactured structure is high, so that a product yield may be ensured. In addition, with the above numerical range, it may be possible to ensure the distance between the virtual touch portion 32 and the effective touch structure 31 to be relatively small. Correspondingly, an area of a region, in which no grid line is arranged, between the two is relatively small, so that a difference in an intensity of reflected light between the gap between the two and the two may be both negligible, which does not increase the visual risk.

For example, an arrangement manner of the dummy regions 313 is not limited. Referring to FIGS. 4 and 5, the plurality of first touch bars 311 and the plurality of second touch bars 312 create a plurality of square regions, the square regions are each referred to as a first square region GM1 below for the convenience of distinction, and each first square region GM1 is a dummy region 313. Referring to FIG. 5, the plurality of virtual touch portions 32 in the touch layer 30 include a plurality of first virtual touch portions 321, and at least one (e.g., each) first virtual touch portion 321 is located in a first square region GM1. As shown in FIGS. 4 and 5, each first square region GM1 is jointly defined by two first touch bars 311 adjacent in the direction Y and two second touch bars 312 adjacent in the direction X. In the thickness direction of the touch layer 30, a contour of each first square region GM1 is a closed contour, and the closed contour is constituted by a portion of a contour of each first touch bar 311 defining the first square region GM1 and a portion of a contour of each second touch bar 312 defining the first square region GM1. The first square region GM1 may be provided with no virtual touch portion 32 or only one virtual touch portion 32, or multiple virtual touch portions 32 separated from one another therein. In a case where there are virtual touch portion(s) 32 disposed in the first square region GM1, a virtual touch portion 32 located in the first square region GM1 is referred to as a first virtual touch portion 321. The first virtual touch portion 321 is located in the first square region GM1, which refers to that a contour of any first virtual touch portion 321 located in the first square region GM1 is within a contour of the first square region GM1, and the contours of the two are spaced apart from each other at every position.

For example, referring to FIG. 5, in the direction Y, a maximum dimension of a (e.g., each) first touch bar 311 is a first width D1, an average value of dimensions h1 of portions of a (e.g., each) first virtual touch portion 321 is a first average width, and the first average width is greater than the first width D1. In the direction X, a maximum dimension of a (e.g., each) second touch bar 312 is a second width D2, an average value of dimensions h2 of portions of a (e.g., each) first virtual touch portion 321 is a fourth average width, and the fourth average width is greater than the second width D2. It will be understood that, in a case where the first average width is greater than the first width D1, the first average width is greater than an average value of dimensions h3 of portions of the first touch bar 311 in the direction Y. Similarly to the second touch bar 312. It is possible to reduce the dimension of the first touch bar 311 in the direction Y and the dimension of the second touch bar 312 in the direction X to a relatively great extent by providing the first virtual touch portion 321, and accordingly it is possible to reduce the RC Loading of the effective touch structure to a relatively great extent, thereby achieving the good touch effect. For example, FIG. 5 shows an example where the shapes of the first touch electrode TE1 and the second touch electrode TE2 are each a hexagon, as for each first touch electrode TE1, the average value of the dimensions s1 of portions of the first touch electrode TE1 in the direction X is greater than the first width D1 of the first touch bar 311. As for each second touch electrode TE2, the average value of the dimensions s3 of portions of the second touch electrode TE2 in the direction Y is greater than the second width D2 of the second touch bar 312. On this premise, the first width D1 is limited to be less than the average value of the dimensions s1 of the portions of the first touch electrode TE1 in the direction X, and the second width D2 is limited to be less than the average value of the dimensions s3 of the portions of the second touch electrode TE2 in the direction Y, which has the above beneficial effects.

For example, referring to FIG. 6, the plurality of first touch bars 311, the plurality of second touch bars 312 and the plurality of virtual touch portions 32 each having a grid shape may create a plurality of second square regions GM2, and a sub-pixel region P corresponds to a second square region GM2. That is, the effective touch structure 31 and the plurality of virtual touch portions 32 are non-overlapping with the sub-pixel regions P, which does not affect the light exit effect of the display panel. Therefore, it is possible to ensure the display effect of the display panel while reducing the RC Loading.

Figure 9:
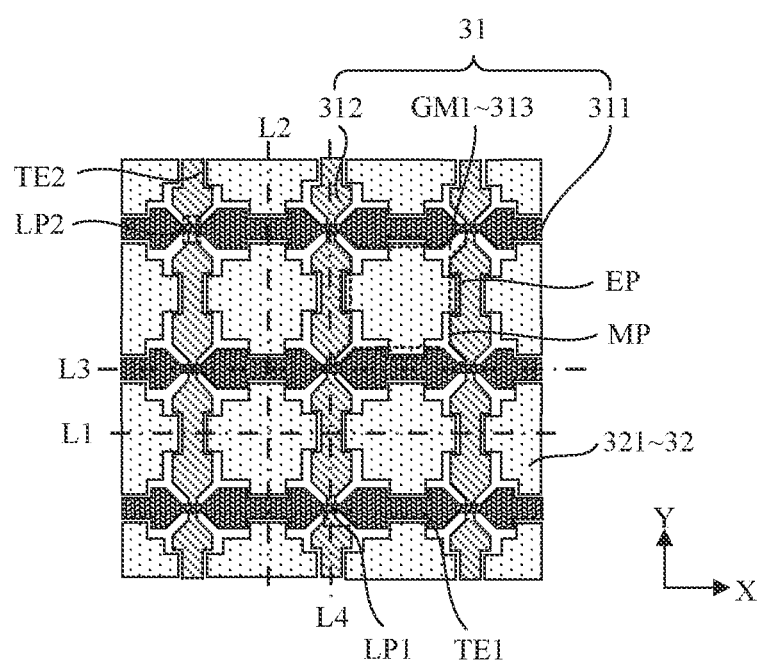
FIG. 9 is a structural diagram of a touch layer, in accordance with other embodiments of the present disclosure.

For example, referring to FIG. 9, the first square region GM1 includes a main region MP and at least one extending region EP (e.g., four extending regions EP); each extending region EP extends from the main region MP into a first touch bar 311 or a second touch bar 312. Each extending region EP may be equivalent to being obtained by removing part of the grid lines of the first touch bar 311, a first touch bar 311 or a second touch bar 312 may have a notch by providing each extending region EP, and a contour of each notch is an opened contour, a contour of each extending region EP coincide with, in the thickness direction of the touch layer 30, a contour of a notch, and a region corresponding to the extending region EP (i.e., a region to which the notch corresponds) is not able to be used for the touch sensing. Due to the provision of the extending regions EP, at least one (e.g., each) first touch bar 311 has at least one notch (e.g., notches), and/or at least one (e.g., each) second touch bar 312 has at least one notch (e.g., notches). That is, only the first touch bar 311 is provided with the notch therein, or only the second touch bar 312 is provided with the notch therein, or the first touch bar 311 and the second touch bar 312 are each provided with the notch therein. FIG. 9 shows an example where the first touch bar 311 and the second touch bar 312 are each provided with the notch therein. Due to the provision of the notches, the area (i.e., the distribution range) of the first touch bars 311 and the second touch bars 312 is reduced, an area of an overlapping region between the entire effective touch structure 31 and the plate of the storage capacitor of the display panel is reduced, and a parasitic capacitance between the two is reduced correspondingly. As a result, the RC loading of the effective touch structure 31 may be further reduced, so as to achieve a better display effect. In a case where the shapes of the first touch bars 311 and the second touch bars 312 change due to the provision of the extending regions EP, the shape of the first square region GM1 defined by the first touch bars 311 and the second touch bars 312 also change. In this case, if a shape of the first virtual touch portion 321 is set only according to the main region MP of the first square region GM1 and the first virtual touch portion 321 does not extend into the extending region EP, a contour of each first virtual touch portion 321 is separated from a contour of the effective touch structure 31 by the extending region EP of the first square region GM1, so that there is a relatively large distance between these two contours. For example, referring to FIG. 9, at least one (e.g., each) first grid region GM1 is provided with a first virtual touch portion 321 therein, and the first virtual touch portion 321 is located in the main region MP and extends into the at least one (e.g., each) extending region EP. For another example, referring to FIG. 10, at least one (e.g., each) first square region GM1 is provided with multiple first virtual touch portions 321 that are insulated from one another therein, at least one (e.g., one) of the multiple first virtual touch portions 321 is located in the main region MP, and each of the rest of the first virtual touch portions 321 is located in an extending region EP. In this way, on the premise that the extending regions EP (i.e., the notches) are provided to reduce the RC Loading, the shape of the first virtual touch portion 321 may be changed correspondingly, so that each extending region EP is provided with grid lines that are able to reflect light in an environment with a high brightness. As a result, the display effect will not be adversely affected. A distance between a contour of a portion, extending into each extending region EP, of the first virtual touch portion 321 and the contour of the effective touch structure 31 having the notches may be set to be in a numerical range from 4.5 µm to 6.5 µm as described above.

Figure 10:
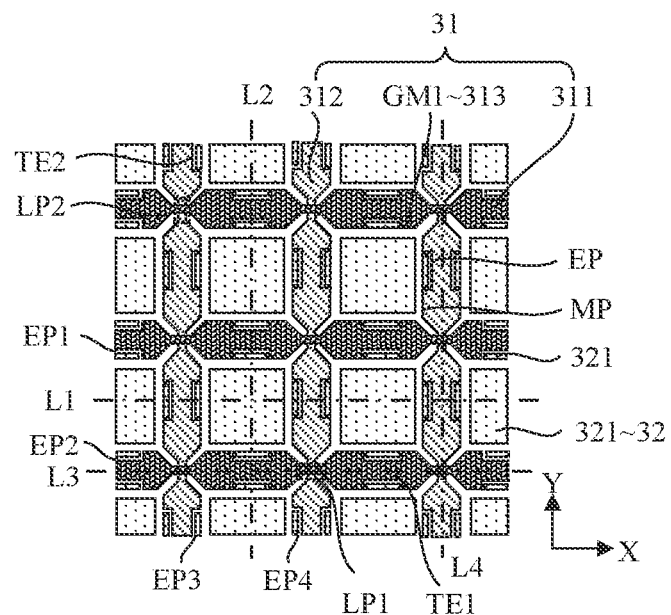
FIG. 10 is a structural diagram of a touch layer, in accordance with yet other embodiments of the present disclosure.

For example, referring to FIGS. 9 and 10, each first virtual touch portion 321 disposed in at least one (e.g., each) first square region GM1 is axial symmetric with respect to an axis parallel to a first axis L1, and the first axis L1 extends in the extending direction (i.e., the direction X) of the first touch bar 311, and/or each first virtual touch portion 321 disposed in at least one (e.g., each) first square region GM1 is axial symmetric with respect to an axis parallel to a second axis L2, and the second axis L2 extends in the extending direction of the second touch bar 312. Since the contour of the first square region GM1 and the contour(s) of the first virtual touch portion(s) 321 disposed therein satisfy the above limitation relationship, each first square region GM1 is axial symmetric with respect to the first axis L1, and/or each first square region GM1 is axial symmetric with respect to the second axis L2. Each first square region GM1 is defined by the two first touch bars 311 adjacent in the direction Y and the two second touch bars 312 adjacent in the direction X. Referring to FIG. 10, in the first square region GM1, two extending regions EP arranged in the direction Y are a first extending region EP1 and a second extending region EP2, and two extending regions EP arranged in the direction X are a third extending region EP3 and a fourth extending region EP4. The first extending region EP1 is obtained by removing part of grid lines in one of the two adjacent first touch bars 311, and the second extending region EP2 is obtained by removing part of grid lines in the other of the two adjacent first touch bars 311; the third extending region EP3 is obtained by removing part of grid lines in one of the two adjacent second touch bars 312, and the fourth extending region EP4 is obtained by removing part of grid lines in the other of the two adjacent second touch bars 312. The first square region GM1 is axial symmetric with respect to the first axis L1. That is, shapes of the first extending region EP1 and the second extending region EP2 are the same. The first square region GM1 is axial symmetric with respect to the second axis L2. That is, shapes of the third extending region EP3 and the fourth extending region EP4 are the same. Thus, the first extending region EP1 and the second extending region EP2 each affect an area of a respective one of the two adjacent first touch bars 311. As a result, the two adjacent first touch bars 311 have a same degree of change of each of the sensing area and the RC loading, thereby ensuring the uniformity of the touch effect. Similarly to the foregoing, the third extending region EP3 and the fourth extending region EP4 each affect each parameter of a respective one of the two adjacent second touch bars 312, which has beneficial effects the same as the above, and details will not be repeated here.

For example, with continued reference to FIGS. 9 and 10, in a case where each first touch bar 311 includes the plurality of first touch electrodes TE1 and the plurality of first coupling portions LP1, and each second touch bar 312 includes the plurality of second touch electrodes TE2 and the plurality of second coupling portions LP2, at least one (e.g., each) first touch electrode TE1 is provided with at least one notch (e.g., two notches) therein, and/or at least one (e.g., each) second touch electrode TE2 is provided with at least one notch (e.g., two notches) therein. The at least one first touch electrode TE1 and the at least one second touch electrode TE2 are each provided with the notch(s) therein, so that the area of the overlapping region between the effective touch structure 31 and the plate of the storage capacitor of the display panel may be reduced to a greatest extent with the arrangement of the notch(s). As a result, the effective touch structure 31 has a small RC loading. As for any first touch electrode TE1 and any first coupling portion LP1 in the first touch bar 311, the dimensions of the first coupling portion LP1 in the direction X and the direction Y are respectively less than dimensions of the first touch electrode TE1 in the direction X and the direction Y. If the notch(s) are provided on the first coupling portion LP1, the dimension of the first coupling portion LP1 in the direction Y will be further reduced, so that a reliability of coupling between two first touch electrodes TE1 adjacent to the first coupling portion LP1 in the direction X is reduced. In order to avoid the above problem, reduce the process difficulty and control the manufacturing costs, the notch(s) are not provided on the first coupling portion LP1 having a smaller dimension but on the first touch electrode TE1 having a larger dimension. For the second touch bar 312, the arrangement of the notch(s) is similar to that for the first touch bar 311, and details will not be repeated here. On the above premise, one (e.g., each) first touch bar 311 is axial symmetric with respect to an axis (referred to as a third axis L3 below) parallel to the first axis L1, and/or one (e.g., each) second touch bar 312 is axial symmetric with respect to an axis (referred to as a fourth axis L4 below) parallel to the second axis L2. That is, one first touch electrode TE1 provided with at least one notch (e.g., two notches) is axial symmetric with respect to the first axis L1, and/or one second touch electrode TE2 provided with at least one notch (e.g., two notches) is axial symmetric with respect to the second axis L2. Each first touch electrode TE1 provided with two notches therein may be axial symmetric with respect to both the third axis L3 and the fourth axis L4, and the first touch electrode TE1 includes a first portion and a second portion respectively located on both sides of the third axis L3 or a third portion and a fourth portion respectively located on both sides of the fourth axis L4. Since shapes of the first portion and the second portion are the same, in a touch process, a changing amount of a capacitance at a position in the first portion is equal to a changing amount of a capacitance at a position, the same as the position in the first portion, in the second portion, and a changing amount of a capacitance at a position in the third portion is equal to a changing amount of a capacitance at a position, the same as the position in the third portion, in the fourth portion. Thus, as for a single first touch electrode TE1, changing amounts of capacitances at different positions thereof are relatively uniform, which is conducive to improving an accuracy of a touch detection. Each second touch electrode TE2 provided with two notches therein may be axial symmetric with respect to both the third axis L3 and the fourth axis L4, and the second touch electrode TE2 includes a fifth portion and a sixth portion respectively located on the both sides of the third axis L3 or a seventh portion and an eighth portion respectively located on the both sides of the fourth axis L4. Similarly to an arrangement of the first touch electrode TE1, it is possible to improve the accuracy of the touch detection by providing the second touch electrode TE2 having two notches to be an axisymmetric pattern, which is conducive to achieving the good touch effect.

Figure 11:
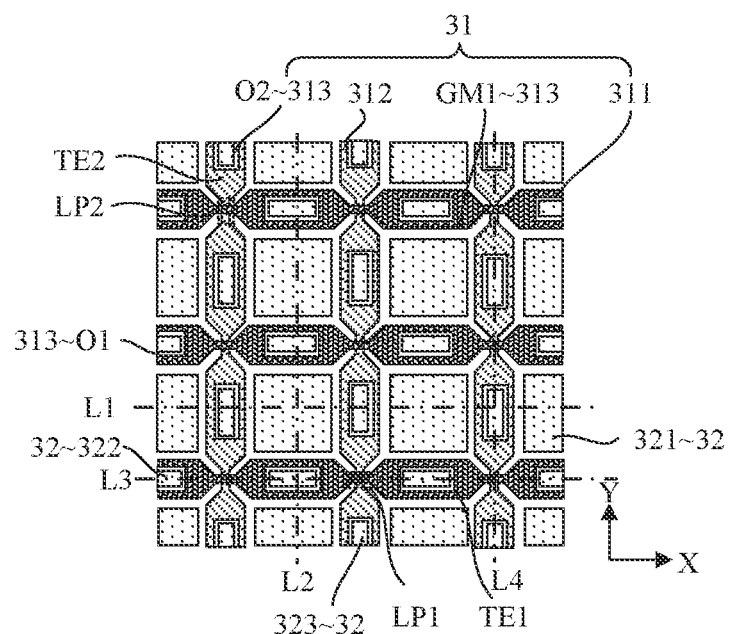
FIG. 11 is a structural diagram of a touch layer, in accordance with yet other embodiments of the present disclosure.
Figure 12:
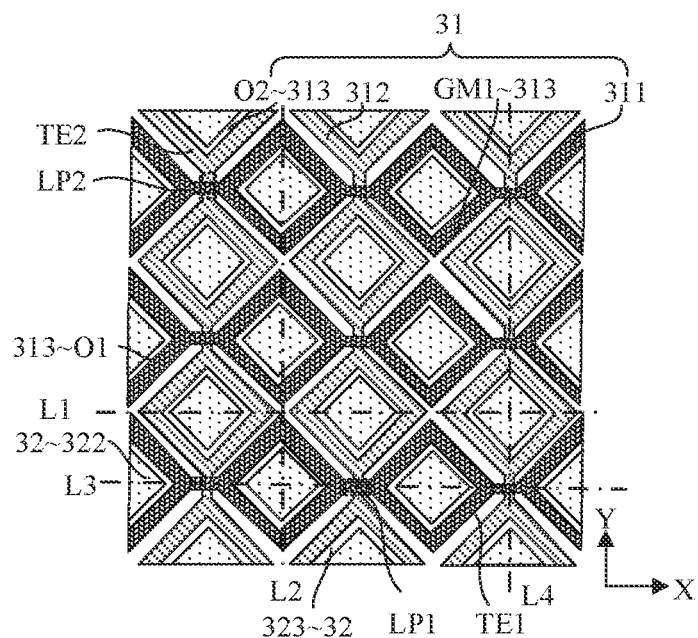
FIG. 12 is a structural diagram of a touch layer, in accordance with yet other embodiments of the present disclosure.

For example, referring to FIGS. 11 and 12, one (e.g., each) first touch bar 311 is provided with at least one (e.g., one) first opening region O1 therein, and each first opening region O1 is a dummy region 313. Considering a first opening region O1 disposed in the first touch bar 311 as an example, a contour of each first opening region O1 is a closed contour, and each first opening region O1 may be equivalent to being obtained by removing a portion of the first touch bar 311. That is, a region corresponding to the first opening region O1 is not able to be used for the touch sensing. The contour of each first opening region O1 is defined by only one first touch bar 311. Each first touch bar 311 may have a plurality of first opening regions O1. For example, referring to FIGS. 11 and 12, one (e.g., each) second touch bar 312 is provided with at least one (e.g., one) second opening region O2 therein, and each second opening region O2 is a dummy region 313.

The plurality of dummy regions 313 of the effective touch structure 31 may be each the first square region GM1. Alternatively, a part of the dummy regions 313 may be the first square region GM1, and the other part of the dummy regions 313 may be the first opening region O1 and/or the second opening region O2.

For example, in the case where each first touch bar 311 includes the plurality of first touch electrodes TE1 and the plurality of first coupling portions LP1, and each second touch bar 312 includes the plurality of second touch electrodes TE2 and the plurality of second coupling portions LP2, at least one first opening region O1 (e.g., one or two first opening regions O1) is located inside a first touch electrode TE1, and/or at least one second opening region O2 (e.g., one or two second opening regions O2) is located inside a second touch electrode TE2. For example, referring to FIGS. 11 and 12, each first touch electrode TE1 is provided with at least one first opening region O1 therein, and each second touch electrode TE2 is provided with at least one second opening region O2 therein. For another example, referring to FIG. 13, at least one (e.g., each) first touch electrode TE1 is provided with at least two first opening regions O1 arranged in a first direction therein, and the first direction is perpendicular to the extending direction of a (e.g., each) first touch bar 311. At least one (e.g., each) second touch electrode TE2 is provided with at least two second opening regions O2 arranged in a second direction therein, and the second direction is perpendicular to the extending direction of a (e.g., each) second touch bar 312. In a case where the first touch bar 311 extends in the direction X, and the second touch electrode TE2 extends in the direction Y, the first direction is the direction Y, and the second direction is the direction X.

The first opening region(s) O1 are disposed in the first touch electrode TE1, so that an area of the first touch electrode TE1 is reduced. As a result, an area of an overlapping region between the first touch electrode TE1 and the plate of the storage capacitor of the display panel may be reduced, and a parasitic capacitance between the two may be correspondingly reduced, and accordingly the RC loading of the first touch electrode TE1 may be reduced. The second opening region(s) O2 are disposed in the second touch electrode TE2, beneficial effects generated thereby are the same as beneficial effects of providing the first opening regions O1 in the first touch electrode TE1, and details will not be repeated here. In addition, each first touch electrode TE1 is provided with one first opening region O1, and each second touch electrode TE2 is provided with one second opening region O2, so that it is possible to reduce the RC loading of the effective touch structure 31 to a greatest extent by arranging the opening regions (including the first opening regions O1 and the second opening regions O2). In addition, the opening regions are disposed only in the plurality of first touch electrodes TE1 and/or the plurality of second touch electrodes TE2 each having a larger dimension, and are not disposed in the plurality of first coupling portions LP1 and/or the plurality of second coupling portions LP2 each having a smaller dimension, so that the process difficulty may be reduced, and it is conducive to controlling the manufacturing costs. In addition, it is possible to ensure a reliability of coupling among structures in the plurality of first touch bars 311 and the plurality of second touch bars 312. On the above premise, referring to FIGS. 11 to 13, similarly to which a portion of the first virtual touch portion 321 extends into each notch, at least one (e.g., each) first opening region O1 is provided with a second virtual touch portion 322 therein, and/or at least one (e.g., each) second opening region O2 is provided with a third virtual touch portion 323 therein. Thus, there are grid lines in each opening region, which may avoid an obvious difference in an intensity of reflected light between the opening region and the effective touch structure 31 while further reducing the RC loading, and reduce the risk of the display mura. A distance between a contour of each second virtual touch portion 322 and the contour of the effective touch structure 31, and a distance between a contour of each third virtual touch portion 323 and the contour of the effective touch structure 31 may be set to be in a numerical range from 4.5 µm to 6.5 µm as described above.

Figure 13:
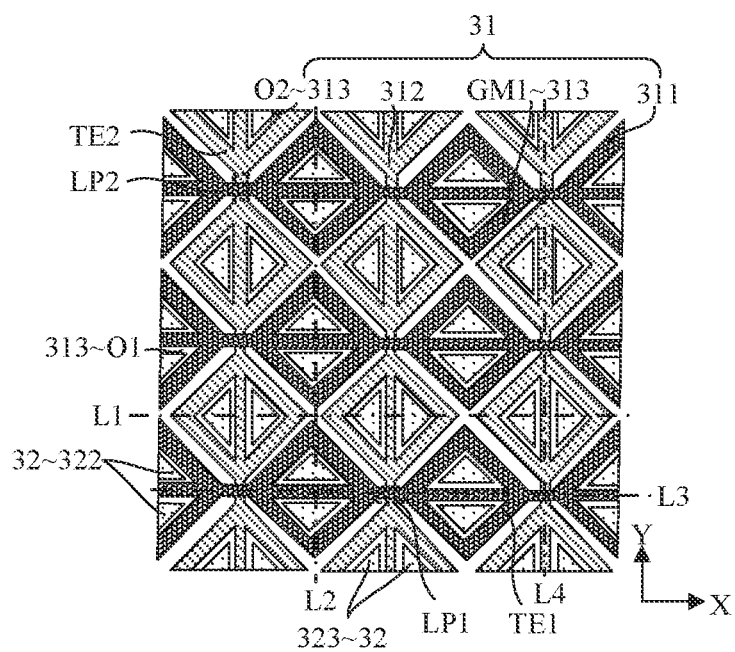
FIG. 13 is a structural diagram of a touch layer, in accordance with yet other embodiments of the present disclosure.

On the above premise, referring to FIGS. 11 to 13, one (e.g., each) first touch bar 311 is symmetric with respect to the third axis L3, and/or one (e.g., each) second touch bar 312 is symmetric with respect to the fourth axis L4. That is, the first touch electrode TE1 provided with at least one opening region (e.g., one or two opening regions) is in a shape of an axisymmetric pattern, and an axis of symmetry thereof is the third axis L3; and/or the second touch electrode TE2 provided with at least one opening region (e.g., one opening region) is in a shape of an axisymmetric pattern, and an axis of symmetry thereof is the fourth axis L4.

Similarly to the above, each first touch electrode TE1 and each second touch electrode TE2 are each provided to be in a shape of the axisymmetric pattern, so that a change of a capacitance of a single touch electrode is relatively uniform. As a result, it is possible to improve the accuracy of the touch detection, which is conducive to achieving the good touch effect.

For example, referring to FIGS. 11 to 13, an area of each second virtual touch portion 322 is ⅓ to ½ of an area of an electrode corresponding to the second virtual touch portion 322, the electrode corresponding to the second virtual touch portion 322 is the first touch electrode TE1, and the first touch electrode TE1 is provided with the first opening region O1 where the second virtual touch portion 322 is located therein. And/or an area of each third virtual touch portion 323 is ⅓ to ½ of an area of an electrode corresponding to the third virtual touch portion 323, the electrode corresponding to the third virtual touch portion 323 is the second touch electrode TE2, and the second touch electrode TE2 is provided with the second opening region O2 where the third virtual touch portion 323 is located therein. The opening regions (including the first opening regions O1 and the second opening regions O2) are provided in order to reduce the RC Loading of the effective touch structure 31, and the provision of the second virtual touch portion 322 and the third virtual touch portion 323 may reduce the risk of the display mura, and there is a limitation relationship of a distance between a contour of each opening region and a contour of a second virtual touch portion 322 or a third virtual touch portion 323 located therein. Thus, the area of the second virtual touch portion 322 is less than the area of the first touch electrode TE1, or the third virtual touch portion 323 is less than the second touch electrode TE2, which is equivalent to that an area of the opening region is less than the area of the first touch electrode TE1 or the second touch electrode TE2. Therefore, due to the above limitation conditions, it is possible to reduce the area of the first touch electrode TE1 or the second touch electrode TE2 by means of the opening region, so as to achieve the reduction of the RC loading, and in addition, it is possible to ensure that the first touch electrode TE1 or the second touch electrode TE2 has a certain sensing area, and thereby ensure a touch sensing effect of the touch layer.

For example, referring to FIG. 4, the plurality of first touch bars 311 may be divided into a plurality of first touch groups GP1, and at least two (e.g., three) first touch bars 311 included in at least one (e.g., each) first touch group GP1 are configured to simultaneously receive a first touch signal. The plurality of second touch bars 312 are divided into a plurality of second touch groups GP2, and at least two (e.g., three) second touch bars 312 included in at least one (e.g., each) second touch group GP2 are configured to simultaneously receive a second touch signal. Referring to FIG. 4, each first touch group GP1 includes three first touch bars 311 that are continuously distributed and coupled to one another, and all first touch bars 311 in the first touch group GP1 receive the first touch signal at the same time; each second touch group GP2 includes three second touch bars 312 that are continuously distributed and coupled to one another, and all second touch bars 312 in the second touch group GP2 simultaneously the second touch signal at the same time. The first touch signal may be the touch driving signal, and the second touch signal may be the touch sensing signal. For another example, the first touch signal may be the touch sensing signal, and the second touch signal may be the touch driving signal, which is taken as an example to continuously describe the solutions of the embodiments of the present disclosure.

For example, three first touch bars 311 adjacent to one another in the direction Y constitute a first touch group GP1, three second touch bars 312 adjacent to one another in the direction X constitute a second touch group GP2, and each first touch group GP1 crosses the plurality of second touch groups GP2. Referring to FIG. 4, the touch layer 30 is divided into a plurality of touch units TP, and a (e.g., each) touch unit TP is a smallest repeating unit covering all crossing positions OVL between a single first touch group GP1 and a single second touch group GP2; a portion, located in the touch unit TP, of each first touch bar 311 of the first touch group GP1 is a first touch section TS1; a portion, located in the touch unit TP, of each second touch bar 312 of the second touch group GP2 is a second touch section TS2. Each crossing position OVL is a position corresponding to a portion where orthographic projections, on the base layer, of the first touch bar 311 and the second touch bar 312 overlap, and each first touch group GP1 and one second touch group GP2 have crossing positions OVL therebetween. For example, referring to FIG. 4, in a case where structures of the first touch group GP1 and the second touch group GP2 are arranged as shown in this figure, a first touch group GP1 and a second touch group GP2 have nine crossing positions OVL therebetween, and thus each touch unit TP covers nine crossing positions OVL. Furthermore, each touch unit TP further includes at least one virtual touch portion 32 (e.g., virtual touch portions 32).

Figure 14:
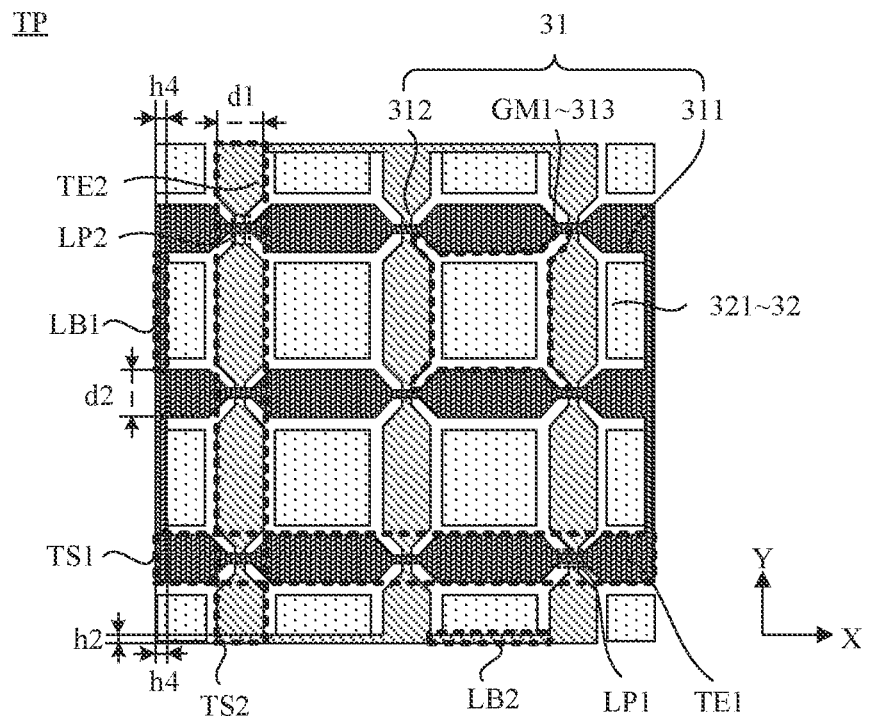
FIG. 14 is a structural diagram of a touch unit, in accordance with some embodiments of the present disclosure.

For example, referring to FIG. 14, the effective touch structure 31 further includes at least one first connection portion LB1 located in the touch unit TP, and each first connection portion LB1 is coupled to two adjacent first touch sections TS1 in the touch unit TP. That is, each first connection portion LB1 is used for being coupled to two adjacent first touch sections TS1 in the touch unit TP, so that two first touch bars 311 respectively including the two first touch sections TS1 are coupled to each other. Two adjacent first touch bars 311 may be connected to each other by only one first connection portion LB1 or multiple first connection portions LB1. It will be understood that, in a case where multiple first connection portions LB1 are disposed between two adjacent first touch bars 311, even if one of the first connection portions LB1 fails, the rest of the first connection portions LB1 may still function, so that the two first touch bars 311 have a relatively high connection reliability. First touch bars 311 in a same first touch group GP1 are connected in parallel by first connection portions LB1, so that a total resistance of the first touch bars 311 in the first touch group GP1 is reduced. As a result, it is conducive to the reduction of the RC loading. However, since the first connection portion LB1 is used for achieving coupling between two first touch bars 311, in a case where the touch layer performs the touch sensing, the first connection portion LB1 will also transmit a same touch signal (which may be the touch driving signal or the touch sensing signal, and is not limited here) as that transmitted by the first touch bar 311. If the first connection portion LB1 overlaps with the second touch bar 312 in the thickness direction of the touch layer, there is a parasitic capacitance between the two, which adversely affects the touch effect. In light of this, referring to FIG. 14, in the thickness direction of the touch layer, each first connection portion LB1 is non-overlapping with the plurality of second touch bars 312. That is, each first connection portion LB1 is non-overlapping with each second touch section TS2 in a touch unit TP including the first connection portion LB1. Therefore, it is possible to avoid creation of the parasitic capacitance while reducing the RC Loading. In the case where each first touch bar 311 includes the plurality of first touch electrodes TE1 and the plurality of first coupling portions LP1, if the plurality of first touch electrodes TE1 and the plurality of first coupling portions LP1 are disposed in different layers, the first connection portions LB1 may be disposed in the same layer as the plurality of first touch electrodes TE1 or the plurality of first coupling portions LP1; if the plurality of first touch electrodes TE1 and the plurality of first coupling portions LP1 are disposed in a same layer, the first connection portions LB1 may be disposed in the same layer as the plurality of first touch electrodes TE1.

For example, a third average width of the first connection portion LB1 is not greater than ⅕ of a second average width of a first touch bar 311 coupled to the first connection portion LB1. An average value of dimensions h3, in a direction (i.e., the direction Y) perpendicular to the extending direction of the first touch bar 311, of portions of the first touch bar 311 is the second average width of the first touch bar 311. In the extending direction (i.e., the direction X) of the first touch bar, a dimension of the first connection portion LB1 is a width thereof, and an average value of widths is the third average width of the first connection portion LB1. Referring to FIG. 14, in a case where the first touch bar 311 includes the plurality of first touch electrodes TE1, an average width (i.e., an average value of dimensions h4 shown in the figure) of a first connection portion LB1 coupled to a first touch electrode TE1 is not greater than an average width (i.e., an average value of dimensions d3) of portions of the first touch electrode TE1. With this arrangement, it is possible to make an overlapping area between the first connection portion LB1 and the plate of the storage capacitor of the display panel relatively small. A shape of a contour of the first connection portion LB1 is not limited, and the shape of the contour of the first connection portion LB1 may be a rectangle, a square, a circle or any other shape. The first connection portion LB1 may extend in the direction Y to be perpendicular to the extending direction of the first touch bar 311, or may extend in a direction intersecting the direction Y, which is not limited.

For example, referring to FIG. 14, the effective touch structure 31 further includes at least one second connection portion LB2 (e.g., a plurality of second connection portions LB2), and each second connection portion LB2 is configured to be coupled to two adjacent second touch sections TS2 in a second touch group GP2. That is, each second connection portion LB2 is used for being coupled to two adjacent second touch sections TS2 in a touch unit TP, so that two second touch bars 312 respectively including the two second touch sections TS2 are coupled to each other. Two adjacent second touch bars 312 may be connected to each other by only one second connection portion LB2 or multiple second connection portions LB2. Similarly to the above, multiple second connection portions LB2 are disposed between two adjacent second touch bars 312, so that the two second touch bars 312 have a relatively high connection reliability, and a total resistance of the second touch bars 312 in the second touch group GP2 is reduced, and in turn the RC loading is reduced. In addition, referring to FIG. 14, in the thickness direction of the touch layer, the second connection portion LB2 is non-overlapping with the plurality of first touch bars 311. That is, each second connection portion LB2 is non-overlapping with each first touch section TS1 in a touch unit TP including the second connection portion LB2. Similarly to an arrangement of the first connection portion LB1, it is possible to avoid the creation of the parasitic capacitance while reducing the RC Loading.

For example, referring to FIG. 14, an average width of the second connection portion LB2 may be not greater than ⅕ of an average width of a second touch bar 312 coupled to the second connection portion LB2. An average value of dimensions, in a direction (i.e., the direction X) perpendicular to the extending direction of the second touch bar 312, of portions of the second touch bar 312 is the average width of the second touch bar 312. A dimension, in the extending direction (i.e., the direction Y) of the second touch bar 312, of the second connection portion LB2 is a width thereof, and an average value of widths of portions of the second connection portion LB2 is the average width of the second connection portion LB2. With continued reference to FIG. 14, in a case where the second touch bar 312 includes the plurality of second touch electrodes TE2, an average width (i.e., an average value of dimensions h5) of portions of a second connection portion LB2 coupled to a second touch electrode TE2 is not greater than an average width (i.e., an average value of dimensions d1) of portions of the second touch electrode TE2. With this arrangement, the second connection portion LB2 has the same beneficial effects as the first connection portion LB1, and details will not be repeated here. In the case where each second touch bar 312 includes the plurality of second touch electrodes TE2 and the plurality of second coupling portions LP2, if the plurality of second touch electrodes TE2 and the plurality of second coupling portions LP2 are disposed in different layers, the plurality of second connection portions LB2 may be disposed in the same layer as the plurality of second touch electrodes TE2 or the plurality of second coupling portions LP2; if the plurality of second touch electrodes TE2 and the plurality of second coupling portions LP2 are disposed in a same layer, the plurality of second connection portions LB2 may be disposed in the same layer as the plurality of second touch electrodes TE2. A shape of a contour of the second connection portion LB2 is not limited, and optional shapes of the contour of the second connection portion LB2 are the same as optional shapes of the contour of the first connection portion LB1, and a shape of the first connection portion LB1 and a shape of the second connection portion LB2 may be the same or different. The second connection portion LB2 may extend in the direction X to be perpendicular to the extending direction of the second touch bar 312, or may extend in a direction intersecting the direction X, which is not limited.

Specific arrangement manners of at least one first connection portion LB1 (e.g., two first connection portions LB1) and at least one second connection portion LB2 (e.g., two second connection portions LB2) in a touch unit TP are not limited. For example, a (e.g., each) first connection portion LB1 located in a touch unit TP is coupled to ends of two adjacent first touch sections TS1, and a (e.g., each) second connection portion LB2 located in a touch unit TP is coupled to ends of two adjacent second touch sections TS2. For example, referring to FIG. 14, each touch unit TP includes four first connection portions LB1 and four second connection portions LB2, each first connection portion LB1 is connected to ends of two adjacent first touch sections TS1, and each second connection portion LB2 is coupled to ends of two adjacent second touch sections TS2. In a case where the first connection portions LB1 and the first touch sections TS1 in each touch unit TP are disposed in a same layer, each first connection portion LB1 is in contact with the ends of the two adjacent first touch sections TS1; in a case where the first connection portions LB1 and the first touch sections TS1 in each touch unit TP are disposed in different layers, each first connection portion LB1 may be coupled to the two adjacent first touch sections TS1 in a manner of providing via holes. For another example, the effective touch structure further includes a plurality of first connection portions LB1 located in a touch unit TP, and a (e.g., each) first connection portion LB1 is located between two adjacent second touch sections TS2. In an extending direction (i.e., the direction X) of the first touch section TS1, the plurality of first connection portions LB1 are respectively arranged on two sides of a second touch section TS2; in an extending direction (i.e., the direction Y) of the second touch section TS2, the plurality of first connection portions LB1 are respectively arranged on two sides of a first touch section TS1. In the plurality of first connection portions LB1, there are at least two (e.g., two) first connection portions LB1 coupled to a same first touch section TS1, and the at least two first connection portions LB1 are respectively located on two sides of a same second touch section TS2. For example, referring to FIG. 15, each touch unit TP includes two first connection portions LB1 and two second connection portions LB2; one first connection portion LB1 and one second connection portion LB2 are disposed between two adjacent first touch sections TS1, and the two second connection portions LB2 are respectively located on two sides of a same second touch section TS2 in the direction X; similarly, one first connection portion LB1 and one second connection portion LB2 are disposed between two adjacent second touch sections TS2, and the two first connection portions LB1 are respectively located on two sides of a same first touch section TS1 in the direction Y.

Figure 15:
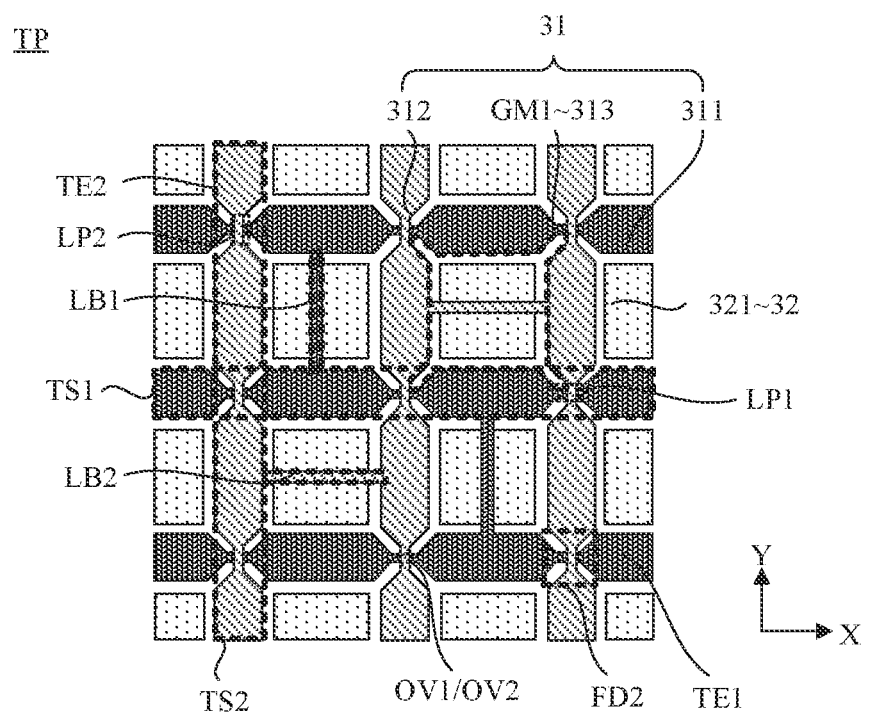
FIG. 15 is a structural diagram of a touch unit, in accordance with other embodiments of the present disclosure.

For example, referring to FIGS. 14 and 15, in a case where the touch layer includes the first connection portions LB1 and the second connection portions LB2, any first connection portion LB1 is non-overlapping with, in the thickness direction of the touch layer, any second connection portion LB2, so that a parasitic capacitance may be prevented from being created between the first connection portion LB1 and the second connection portion LB2. As a result, the RC Loading of the entire touch layer will not be increased.

For example, referring to FIGS. 14 and 15, in at least one (e.g., each) touch unit TP, a total area of all virtual touch portions 32 is 35% to 45% of an area of the touch unit TP. A proportion of the total area of all virtual touch portions 32 in the touch unit TP to the area of the touch unit TP is relatively low, so that it is possible to ensure the touch layer to have a sufficient sensing area and ensure the touch sensing effect of the touch layer while reducing the RC Loading.

Figure 16:
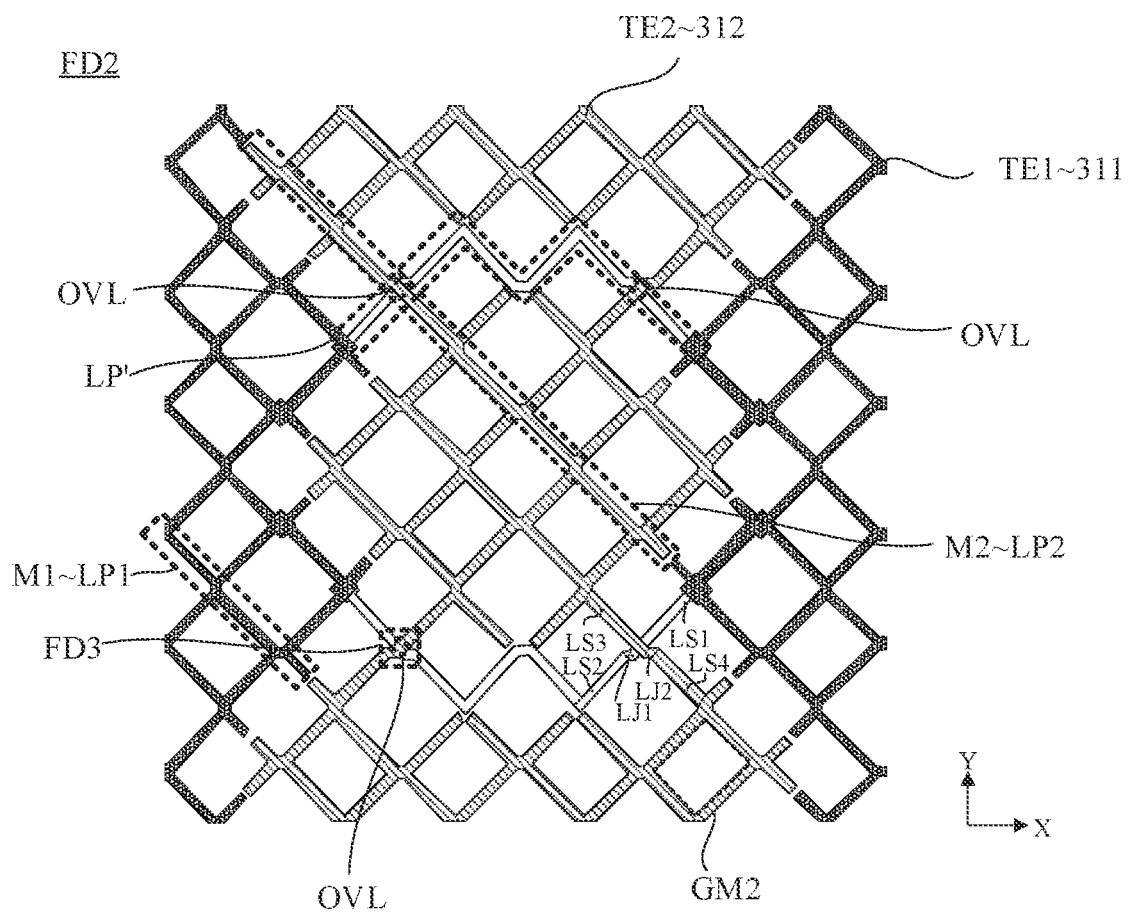
FIG. 16 is an enlargement view of the FD2 region in FIG. 15.
Figure 17:
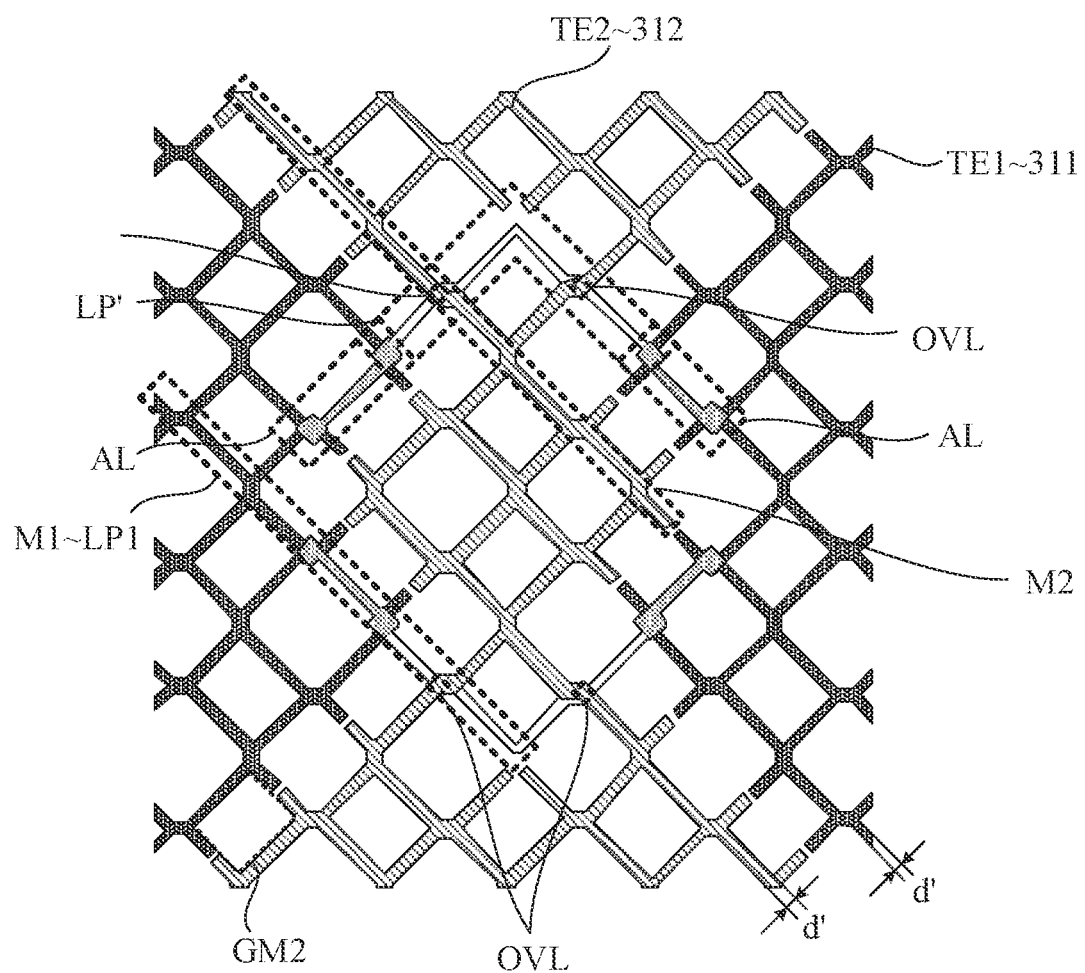
FIG. 17 is a structural diagram of a first coupling portion, in accordance with some embodiments of the present disclosure.

For example, referring to FIGS. 16 and 17, a (e.g., each) first touch bar 311 is a metal mesh constituted by a plurality of first metal lines M1, and a (e.g., each) second touch bar 312 is a metal mesh constituted by a plurality of second metal lines M2. Each first metal line M1 may include a plurality of metal line segments extend substantially in a same direction, and the plurality of metal line segments are coupled to one another; each second metal line M2 may include a plurality of metal line segments extend substantially in a same direction, and the plurality of metal line segments are coupled to one another. The first touch bar 311 includes the plurality of first metal lines M1, and the plurality of first metal lines M1 intersect one another. The second touch bar 312 includes the plurality of second metal lines M2, and the plurality of second metal lines M2 intersect one another. A first metal line M1 is perpendicular to at least one (e.g., one) second metal line M2 at a crossing position OVL between each first touch bar 311 and one second touch bar 312. In the plurality of first metal lines M1, extending directions of at least two first metal lines M1 intersect; in the plurality of second metal lines M2, extending directions of at least two second metal lines M2 intersect. In a case where line widths of the first metal line M1 and the second metal line M2 are determined, with the above arrangement, an area of a portion where the first touch bar 311 and the second touch bar 312 overlap may be reduced to a greatest extent, thereby reducing a parasitic capacitance between the two to a greatest extent.

Referring to FIG. 17, widths d' of each first metal line M1 in the first touch bar 311 and each second metal line M2 in the second touch bar 312 are each in a numerical range from 1.5 µm to 5 µm, and an area of a region where a first crossing portion OV1 and a second crossing portion OV2 overlap is in a range from 2.25 µm² to 25 µm².

Figure 18:
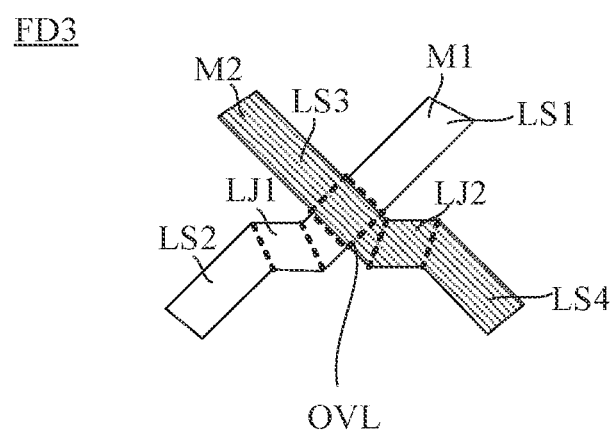
FIG. 18 is an enlargement view of the FD3 region in FIG. 16.
Figure 19:
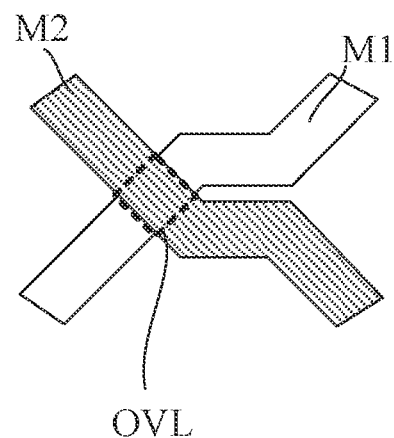
FIG. 19 is a structural diagram of metal lines, in accordance with some embodiments of the present disclosure.
Figure 20:
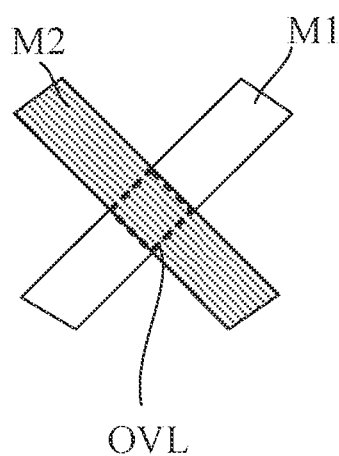
FIG. 20 is a structural diagram of metal lines, in accordance with other embodiments of the present disclosure.

For example, in the embodiments of the present disclosure, only a first metal line M1 and a second metal line M2 crossing each other to be perpendicular to each other, and extending directions of other first metal lines M1 connected to the first metal line M1 and other second metal lines M2 connected to the second metal line M2 are not limited. For example, referring to FIGS. 16 and 18, as for the first metal line M1 and the second metal line M2 crossing each other, the first metal line M1 includes a first line segment LS1, a second line segment LS2 and a first connection line segment LJ1 that are disposed in a same layer; the first line segment LS1 and the second line segment LS2 are each substantially extend in an extending direction of the first metal line M1 and are not located on a straight line, two ends of the first connection line segment LJ1 are respectively in contact with the first line segment LS1 and the second line segment LS2, and an extending direction of the first connection line segment LJ1 intersects (e.g., being perpendicular to) an extending direction of the first line segment LS1 and the second line segment LS2; the second metal line M2 includes a third line segment LS3, a fourth line segment LS4 and a second connection line segment LJ2 that are disposed in a same layer; the third line segment LS3 and the fourth line segment LS4 are each substantially extend in an extending direction of the second metal line M2 and are not located on a straight line, and two ends of the second connection line segment LJ2 are respectively in contact with the third line segment LS3 and the fourth line segment LS4. The first metal line M1 and the second metal line M2 are located in different layers; at the crossing position, the first line segment LS1 crosses and is perpendicular to the third line segment LS3, or the first line segment LS1 crosses and is perpendicular to the fourth line segment LS4. For another example, the extending directions of all metal line segments included in the first metal line M1 and the second metal line M2 crossing each other may be as shown in FIGS. 19 and 20, or may be arranged in other manners, as long as metal line segments are all disposed in a range defined by the pixel definition region so that each sub-pixel region is located in a second square region created by the metal lines.

For example, with continued reference to FIG. 16, in the case where each first touch bar 311 includes the plurality of first touch electrodes TE1 and the plurality of first coupling portions LP1, and each second touch bar 312 includes the plurality of second touch electrodes TE2 and the plurality of first coupling portions LP2, each first coupling portion LP1 is constituted by first metal lines M1, and each second coupling portion LP2 is constituted by second metal lines M2. Referring to FIG. 16, at least one (e.g., each) first coupling portion LP1 may include at least one coupling sub-portion LP' (e.g., one or more coupling sub-portions LP'), each coupling sub-portion LP' is constituted by first metal lines M1, the first metal lines M1 constituting the coupling sub-portion LP' are coupled to one another, and each coupling sub-portion LP' is configured to couple two adjacent first touch electrodes TE1 in the direction X. In a case where the first coupling portion LP1 includes a plurality of coupling sub-portions LP', e.g., two coupling sub-portions LP', the two coupling sub-portions LP' are not in contact with each other. In this way, in a case where one of the coupling sub-portions LP' fails, the other of the coupling sub-portions LP' is still used for coupling, thereby improving the reliability. In the case where the first coupling portion LP1 includes the plurality of coupling sub-portions LP', shapes of the plurality of coupling sub-portions LP' may be substantially the same, or may be different from one another. In addition, an arrangement manner of the plurality of coupling sub-portions LP' included in the first coupling portion LP1 is not limited. For example, referring to FIG. 16, each coupling sub-portion LP' is constituted by six first metal lines M1, the coupling sub-portion LP' is substantially in a shape of "W", and the coupling sub-portion LP' and the second touch bar 312 have two crossing positions OVL therebetween; the plurality of coupling sub-portions LP' have a substantially same shape, and the plurality of coupling sub-portions LP' are symmetrically arranged in the direction Y. For another example, referring to FIG. 17, each coupling sub-portion LP' is constituted by four first metal lines M1, the coupling sub-portion LP' is substantially in a shape of "V", and the coupling sub-portion LP' and the second touch bar 312 have two crossing positions OVL therebetween; the plurality of coupling sub-portions LP' have a substantially same shape, and the plurality of coupling sub-portions LP' are symmetrically arranged in the direction Y. For yet another example, the plurality of coupling sub-portions LP' have a substantially same shape and are sequentially arranged in the direction Y, and first metal lines M1 each corresponding to a same position in a respective coupling sub-portion LP' of different coupling sub-portions LP' are substantially extend in a same direction. For yet another example, shapes of any two coupling sub-portions LP' of the plurality of coupling sub-portions LP' are different, and the plurality of coupling sub-portions LP' are sequentially arranged in the direction Y.

Figure 21:
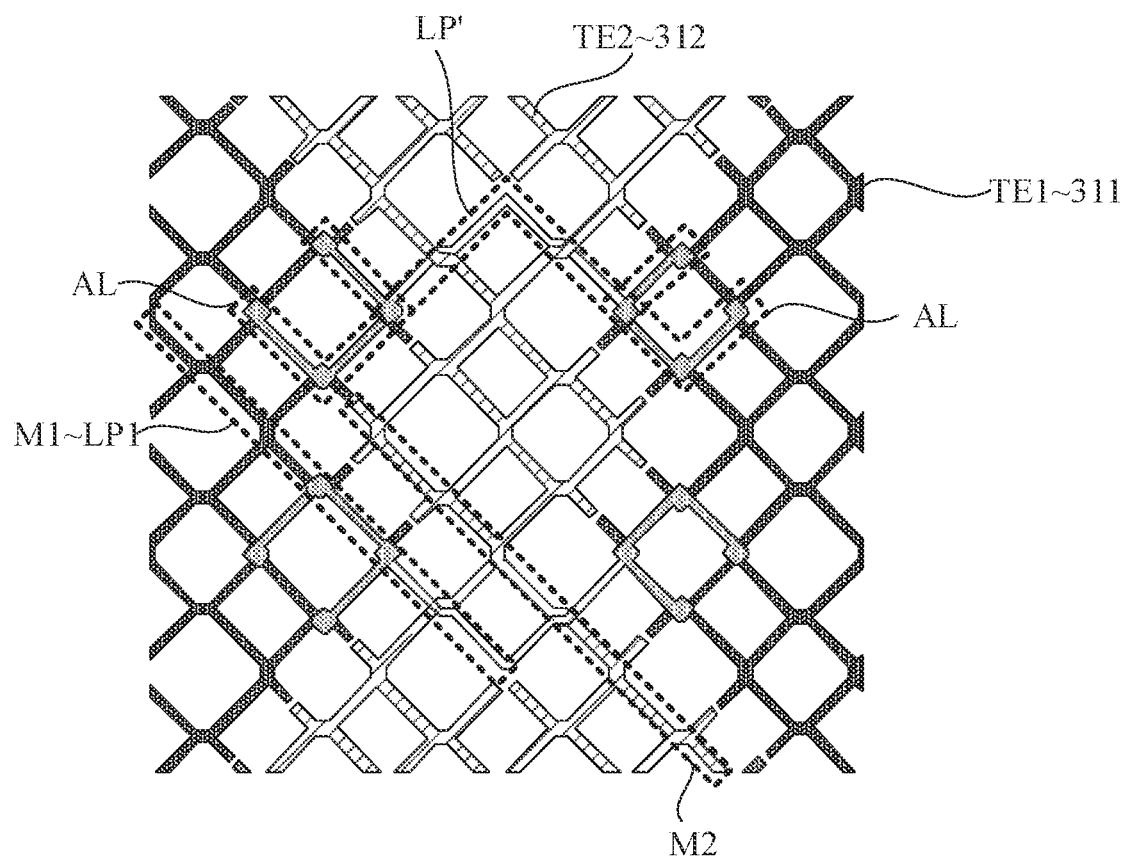
FIG. 21 is a structural diagram of first coupling portions, in accordance with other embodiments of the present disclosure.
Figure 22:
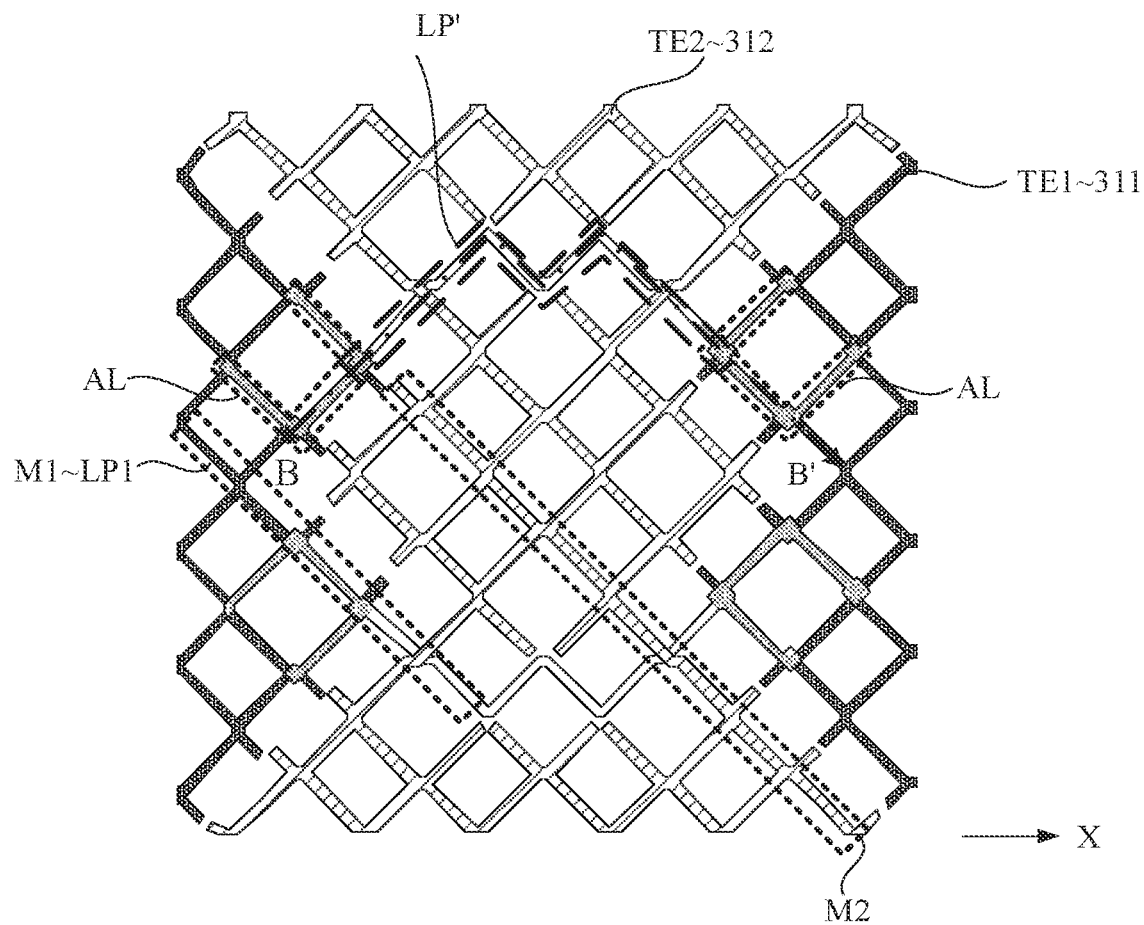
FIG. 22 is a structural diagram of first coupling portions, in accordance with yet other embodiments of the present disclosure.

For example, referring to FIGS. 17, 21 and 22, in the case where the plurality of first touch electrodes TE1 and the plurality of first coupling portions LP1 are disposed in different layers, each first coupling portion LP1 may further include at least one auxiliary coupling portion AL (e.g., a plurality of auxiliary coupling portions AL), each auxiliary coupling portion AL is coupled to a coupling sub-portion LP' and a first touch electrode TE1, and each coupling sub-portion LP' may be coupled to multiple (e.g., two) auxiliary coupling portions AL. Each auxiliary coupling portion AL is constituted by at least one first metal line M1 (e.g., three first metal lines M1). For example, referring to FIG. 22, each first coupling portion LP1 includes two coupling sub-portions LP' each in the shape of "V" and two auxiliary coupling portions AL, and an end of each coupling sub-portion LP' is coupled to an auxiliary coupling portion AL, thereby improving a reliability of coupling between a first coupling portion LP1 and a first touch electrode TE1. Further, an orthographic projection, on the display panel, of each auxiliary coupling portion AL coincides with an orthographic projection, on the display panel, of at least one first metal line M1 (e.g., three first metal lines M1) in the first touch electrode TE1 coupled to the auxiliary coupling portion AL, so that an viewing angle of the auxiliary coupling portion AL is the same as an viewing angle of the first metal line M1. As a result, it is possible to avoid increasing the visual risk while improving the reliability. In addition, it is possible to prevent the sub-pixels disposed in the second square regions of the grid structure from being blocked. For another example, specific arrangements of the coupling sub-portions LP' and the auxiliary coupling portions AL in the first coupling portion LP1 may be as shown in FIG. 22, which has beneficial effects the same as the above, and details will not be repeated here.

Figure 23:
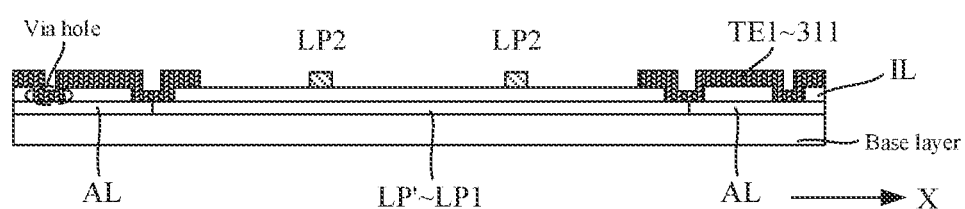
FIG. 23 is a sectional view of the first coupling portion taken along the B-B' line in FIG. 22.
Figure 24:
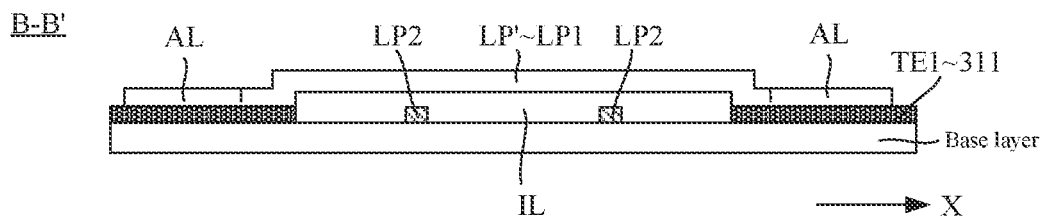
FIG. 24 is another sectional view of the first coupling portion taken along the B-B' line in FIG. 22.

For example, referring to FIGS. 22 and 23, in a case where the first touch electrodes TE1 and the first coupling portions LP1 are disposed in different layers, and the second touch electrodes TE2 and the second coupling portions LP2 are disposed in the same layer, each coupling sub-portion LP' may be coupled to two adjacent first touch electrodes TE1 in the direction X through at least two (e.g., four) via holes, and the coupling sub-portion LP' is disposed on a side of the first touch electrode TE1 proximate to the base layer. For example, referring to FIGS. 22 and 24, in a case where the first coupling portion LP1 is disposed on a side of the first touch electrode TE1 away from the base layer, each coupling sub-portion LP' may be coupled to two adjacent first touch electrodes TE1 in the direction X in a bridging manner.

Figure 25:
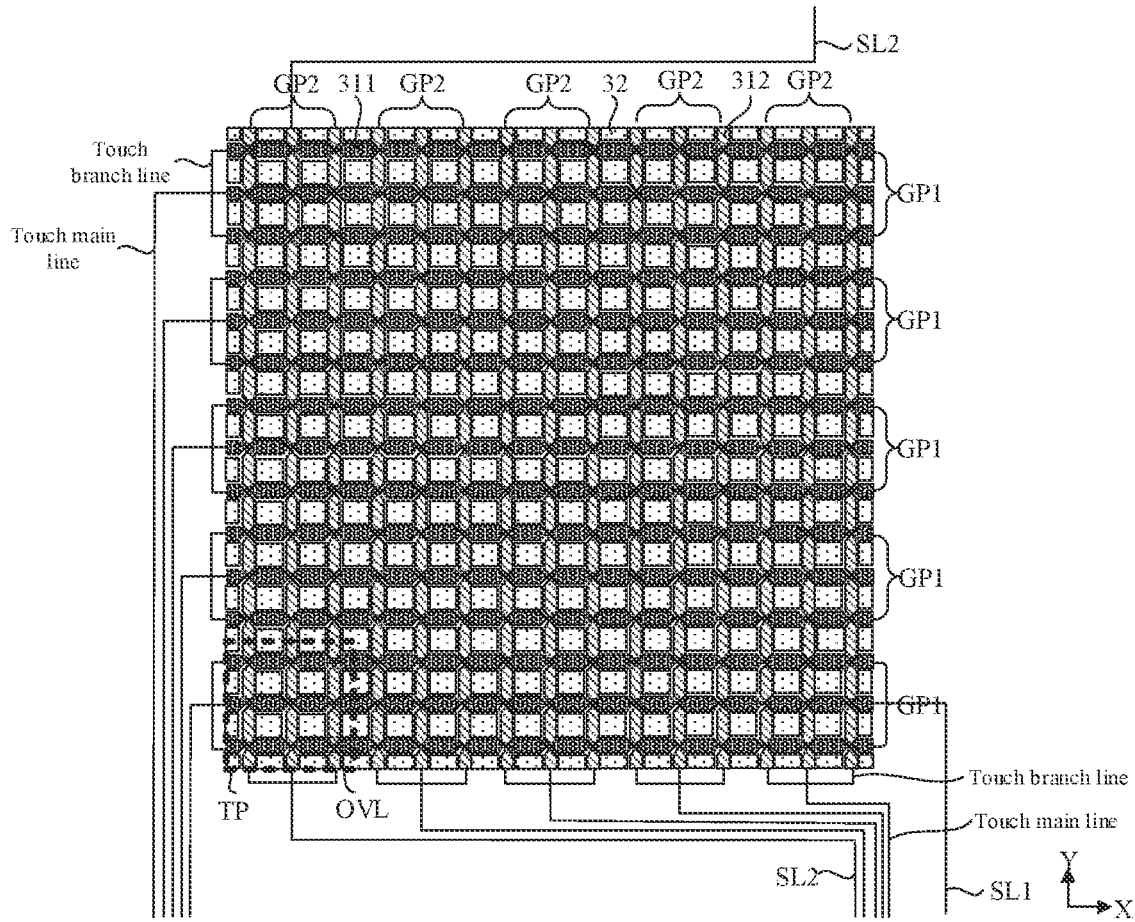
FIG. 25 is a structural diagram of touch signal lines, in accordance with some embodiments of the present disclosure.

Based on the above, referring to FIG. 25, in a case where the touch layer is applied to the touch display apparatus, the touch display apparatus further includes a plurality of touch signal lines, and the plurality of touch signal lines include a plurality of first signal lines SL1 and a plurality of second signal lines SL2; each first signal line SL1 is coupled to at least one (e.g., one) first touch bar 311 and configured to transmit the first touch signal, and each second signal line SL2 is coupled to at least one (e.g., one) second touch bar 312 and configured to transmit the second touch signal.

For example, if each first touch bar 311 is coupled to only one first signal line SL1, and each second touch bar 312 is coupled to only one second signal line SL2, i.e., a driving method of 1T1R (T represents the touch driving electrode, and R represents the touch sensing electrode), an intensity of a signal is attenuated due to the RC Loading of the first touch bar 311. As a result, in the direction X, there may be a difference in an intensity between a portion of the first touch bar 311 proximate to the first signal line SL1 and a portion of the first touch bar 311 away from the first signal line SL1, so that the touch sensing effect of the first touch bar 311 is non-uniform. If each second touch bar 312 is coupled to only one second signal line SL2, there may be a problem the same as the above. In order to solve the problem, for example, in the direction X, each end of each first touch bar 311 is coupled to one first signal line SL1. That is, two ends of the first touch bar 311 are respectively coupled to two first signal lines SL1. The two first signal lines SL1 coupled to the first touch bar 311 each transmit a same touch signal. And/or in the direction Y, two ends of each second touch bar 312 are respectively coupled to two second signal lines SL2, and the two second signal lines SL2 coupled to the second touch bar 312 each transmit a same touch signal, i.e., a driving method of 2T2R. With this arrangement, the degree of the signal attenuation may be reduced, which is conducive to improving uniformity of sensing, and improving the coding frequency, the reporting rate, the touch sensitivity, etc. In addition to the driving methods of 1T1R and 2T2R, a driving method of 2T1R or 1T2R may be adopted, of which an arrangement manner is similar to those mentioned above, and details will not be repeated here.

The plurality of touch signal lines are located within a region defined by the peripheral area. In addition, in order to prevent the touch signal lines from being shorted to one another, there is a distance, at every position, between any two signal lines arranged in a same direction. Therefore, in a case where there are a large number of touch signal lines, it is necessary to set an area of the peripheral area to be large accordingly, which is not conducive to a design of a narrow bezel of the touch display apparatus. For example, referring to FIG. 25, in a case where the plurality of first touch bars 311 are divided into the plurality of first touch groups GP1, and the plurality of second touch bars 312 are divided into the plurality of second touch groups GP2, each first touch group GP1 is coupled to one first signal line SL1, and each second touch group GP2 is coupled to one second signal line SL2. Thus, only a small number of first signal lines SL1 and a small number of second signal lines SL2 are needed to achieve the touch control, and the peripheral area with a small area may be provided accordingly, which is conducive to achieving the narrow bezel.

In the related art, each touch bar in the touch layer is coupled to a touch and display driver integration (TDDI) chip through the touch signal line, and the touch control is achieved under control of the TDDI chip. In a large-sized touch display apparatus, a resistance between the TDDI chip and a remote touch bar (i.e., a touch bar having a relatively large distance to the TDDI chip) is relatively large, so that RC Loading of the remote touch bar is relatively large; a resistance between the TDDI chip and a proximal touch bar (i.e., a touch bar closer to the TDDI chip than the remote touch bar) is relatively small, so that RC Loading of the proximal touch bar is relatively small. During touch scanning, the RC loading of the remote touch bar exceeds a driving capability of the TDDI chip, which makes it difficult or even unable to drive the remote touch bar. In addition, there is a relatively great difference between the RC loading of the remote touch bar and the RC loading of the proximal touch bar, which makes it difficult to achieve the improvements of the performance parameters of the coding frequency, the reporting rate, the touch sensitivity and the like, so that the user's requirements for the touch performance can not be satisfied.

In order to solve the above problem, for example, referring to FIG. 25, in the case where the touch layer includes the plurality of first touch groups GP1 and the plurality of second touch groups GP2, in which a first touch group GP1 or a second touch group GP2 is referred to as a touch group including a plurality of touch bars, in the direction X, each end of each first touch group GP1 is coupled to one first signal line SL1 (that is, two ends of the first touch group GP1 are respectively coupled to two first signal lines SL1); in the direction Y, two ends of each second touch group GP2 are respectively coupled to two second signal lines SL2. Two adjacent first touch bars 311 in the first touch group GP1 may be coupled through first connection portions LB1, and two adjacent second touch bars 312 in the second touch group GP2 may be coupled through second connection portions LB2, so that this coupling structure has a relatively high reliability. Similarly to the above, two ends of each touch group are respectively coupled to two touch signal lines, which may reduce a difference in an intensity among touch signals at different positions inside the touch group, so that it is conducive to improving uniformity of the touch control. As a result, the problems mentioned above may be avoided.

For example, a specific structure of each touch signal line is not limited. For example, each touch signal line may be a single line with at least one inflection point (e.g., one or two inflection points). For another example, referring to FIG. 25, each touch signal line is coupled to one touch group, and each touch signal line may include a touch main line and a plurality of (e.g., three) touch branch lines. An end of each touch branch line is coupled to one touch bar in the touch group, and the other end of the touch branch line is coupled to the touch main line. Since the touch bars in the touch group are coupled to one another, even if coupling between a certain touch branch line and the touch bar fails, remaining touch branch lines are still used for coupling, so that the reliability may be improved.

Figure 26:
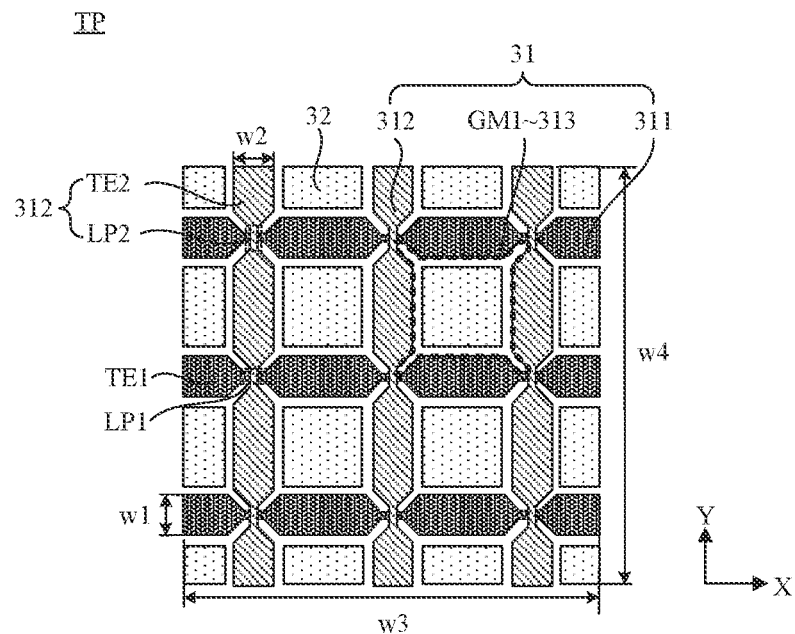
FIG. 26 is a structural diagram of a touch unit of the embodiments of the present disclosure in a simulation experiment.
Figure 27:
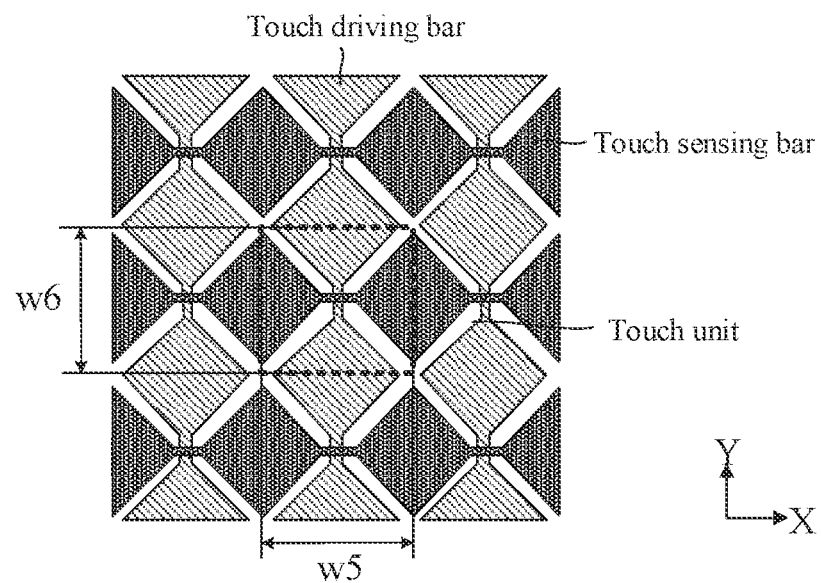
FIG. 27 is a structural diagram of a touch unit of the related art in a simulation experiment.

In order to verify an improvement of the touch effect by an arrangement manner in the embodiments of the present disclosure, various performance parameters of an improved touch layer are obtained through simulation experiments and are compared with performance parameters of a touch layer in the related art. The shapes of the first touch bar 311 and the second touch bar 312 are provided as shown in FIG. 26; a width w1, in the direction Y, of the first touch electrode TE1 in the first touch bar 311 is 0.65 mm; a width w2, in the direction X, of the second touch electrode TE2 in the second touch bar 312 is 0.65 mm. Each first touch bar 311 is configured to transmit the touch sensing signal, and each second touch bar 312 is configured to transmit the touch driving signal. Each touch group includes three touch bars coupled to one another. Each touch unit is in a shape of a square, and a length w3 and a width w4, respectively in the direction X and the direction Y, of the touch unit are each 4 mm. Each touch unit includes multiple virtual touch portions, and a total area of all the virtual touch portions is 35% of an area of the touch unit. A structure of the touch layer in the related art is as shown in FIG. 27; the touch layer includes a plurality of touch sensing bars extending in the direction X and arranged in the direction Y and a plurality of touch driving bars extending in the direction Y and arranged in the direction X. Each touch sensing bar is configured to transmit the touch sensing signal, and each touch driving bar is configured to transmit the touch driving signal. In the related art, a length w5 and a width w6 of each touch unit are each 4 mm.

Various items of data shown in table 1 are obtained by inputting a same touch signal into the improved touch layer in the embodiments of the present disclosure and the touch layer in the related art and performing a same touch operation thereon.

TABLE 1

| Simulation parameters of a single touch unit | Related art | Embodiments of the present disclosure | Rate of change |
|---|---|---|---|
| Cm1 (pF)/no touch | 0.9 | 0.6 | / |
| Cm2 (pF)/touch | 0.8 | 0.55 | / |
| ΔCm (pF) | 0.05 | 0.06 | / |
| ΔCm/Cm2 (pF) | 5.55% | 10% | / |
| C1 (pF) | 10.5 | 8.6 | Reduced by 18.09% |
| C2 (pF) | 9.8 | 7.9 | Reduced by 19.38% |
| R1 (Ω) | 17 | 8.5 | Reduced by 50% |
| R2 (Ω) | 16 | 7.5 | Reduced by 53.12% |
| F1 (kHz) | 160 | 230 | Improved by 43.75% |
| F2 (kHz) | 230 | 300 | Improved by 30.43% |

In table 1, Cm1 represents a mutual capacitance value among touch bars transmitting different touch signals in a single touch unit when the touch operation is not performed, Cm2 represents a mutual capacitance value among the touch bars transmitting the different touch signals in the single touch unit during the touch operation, and ΔCm is equal to Cm1 minus Cm2 (i.e., ΔCm=Cm1−Cm2); C1 represents a capacitance value between first touch sections that are coupled to one another in the single touch unit and the plate of the storage capacitor of the display panel; C2 represents a capacitance value between second touch sections that are coupled to one another in the single touch unit and the plate of the storage capacitor of the display panel; R1 represents a total resistance of the first touch sections that are coupled to one another in the single touch unit; R2 represents a total resistance of the second touch sections that are coupled to one another in the single touch unit. F1 represents a sensing frequency of the TDDI chip when the driving method of 1T1R is adopted, and F2 represents a sensing frequency of the TDDI chip when the driving method of 2T1R is adopted. It can be seen from the above table that C1, C2, R1, R2, that are obtained from the experiments, of the touch layer in the embodiments of the present disclosure are respectively less than C1, C2, R1, R2, that are obtained from the experiments, of the touch layer in the related art, so that the touch layer in the embodiments of the present disclosure has less RC loading. Moreover, the greater a numerical value of which ΔCm is divided by Cm2 (i.e., ΔCm/Cm2), the higher the touch sensitivity; a numerical value of ΔCm/Cm2 of the touch layer in the embodiments of the present disclosure is greater than a numerical value of ΔCm/Cm2 of the touch layer in the related art, so that the touch layer in the embodiments of the present disclosure has a higher touch sensitivity. In addition, as for different driving methods, F1 and F2 of the touch layer in the embodiments of the present disclosure are respectively greater than F1 and F2 of the touch layer in the related art, so that the coding frequency and the reporting rate are improved. To sum up, compared with the related art, various parameters of the touch layer in the embodiments of the present disclosure are significantly improved, so as to achieve a better touch effect.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A touch layer, comprising:
   an effective touch structure including a plurality of first touch bars extending substantially in a same direction, and a plurality of second touch bars extending substantially in a same direction;
   wherein the plurality of first touch bars cross and are insulated from the plurality of second touch bars; and the effective touch structure has a plurality of dummy regions that are non-overlapping with, in a thickness direction of the touch layer, both the plurality of first touch bars and the plurality of second touch bars;
   a plurality of virtual touch portions each insulated from both the plurality of first touch bars and the plurality of second touch bars; wherein at least one virtual touch portion is located in a dummy region; and
   an insulating layer;
   wherein in the thickness direction of the touch layer, the insulating layer is provided between the plurality of first touch bars and the plurality of second touch bars, in areas where the plurality of first touch strips overlap the plurality of second touch strips.

2. The touch layer according to claim 1, wherein in the thickness direction of the touch layer, the plurality of first touch bars cross the plurality of second touch bars to create a plurality of square regions;
   a square region is the dummy region;
   the plurality of virtual touch portions include a plurality of first virtual touch portions, and at least one first virtual touch portion is located in the square region.

3. The touch layer according to claim 2, wherein in a direction perpendicular to an extending direction of a first touch bar, a maximum dimension of the first touch bar is a first width, and an average value of dimensions of portions of a first virtual touch portion of the plurality of first virtual touch portions is a first average width;
   the first average width is greater than the first width.

4. The touch layer according to claim 2, wherein the square region includes a main region and at least one extending region;
   each extending region extends from the main region into a first touch bar or a second touch bar; and
   the square region is provided with a single first virtual touch portion, and the single first virtual touch portion is located in the main region and extends into the at least one extending region; or
   the square region is provided with first virtual touch portions, that are insulated from one another, of the plurality of first virtual touch portions, at least one of the first virtual touch portions of the plurality of first virtual touch portions is located in the main region, and each of the rest of the first virtual touch portions is located in an extending region.

5. The touch layer according to claim 2, wherein each first virtual touch portion disposed in the square region is axial symmetric with respect to an axis extending in an extending direction of a first touch bar and/or an axis extending in an extending direction of a second touch bar.

6. The touch layer according to claim 1, wherein a first touch bar includes a plurality of first touch electrodes and a plurality of first coupling portions that are alternately arranged and coupled to one another;
   a second touch bar includes a plurality of second touch electrodes and a plurality of second coupling portions that are alternately arranged and coupled to one another;
   at a position where the first touch bar and the second touch bar cross each other in the thickness direction of the touch layer, a first coupling portion of the first touch bar and a second coupling portion of the second touch bar have an overlapping region therebetween.

7. The touch layer according to claim 6, wherein a virtual touch portion and the plurality of first touch electrodes are disposed in a same layer; and/or
   another virtual touch portion and the plurality of second touch electrodes are disposed in a same layer.

8. The touch layer according to claim 1, wherein a first touch bar is provided with at least one first opening region therein, and a first opening region is the dummy region;
   the plurality of virtual touch portions include a plurality of second virtual touch portions, and a second virtual touch portion is located in the first opening region.

9. The touch layer according to claim 8, wherein the first touch bar includes a plurality of first touch electrodes and a plurality of first coupling portions;
   the first opening region is located inside a first touch electrode.

10. The touch layer according to claim 9, wherein the first touch electrode is provided with a single first opening region therein; or the first touch electrode is provided with at least two first opening regions therein, and the at least two first opening regions are arranged in a direction perpendicular to an extending direction of the first touch bar.

11. The touch layer according to claim 9, wherein the first touch electrode is symmetric with respect to an axis extending in an extending direction of the first touch bar; and/or an area of the second virtual touch portion is ⅓ to ½ of an area of the first touch electrode.

12. The touch layer according to claim 1, wherein a second touch bar is provided with at least one second opening region therein, and a second opening region is the dummy region;

the plurality of virtual touch portions include a plurality of third virtual touch portions, and a third virtual touch portion is located in the second opening region; or a contour of the dummy region and a contour of each virtual touch portion in the dummy region have a gap therebetween, and a width of the gap is not less than 4.5 μm and not greater than 6.5 μm.

13. The touch layer according to claim 1, wherein the plurality of first touch bars are divided into a plurality of first touch groups, and at least two first touch bars included in a first touch group are configured to simultaneously receive a first touch signal; and the plurality of second touch bars are divided into a plurality of second touch groups, and at least two second touch bars included in a second touch group are configured to simultaneously receive a second touch signal.

14. The touch layer according to claim 13, wherein the touch layer is divided into a plurality of touch units, and a touch unit is a smallest repeating unit covering all crossing positions between the first touch group and the second touch group;

a portion, located in the touch unit, of each first touch bar of the first touch group is a single first touch section;

a portion, located in the touch unit, of each second touch bar of the second touch group is a single second touch section;

the effective touch structure further includes at least one first connection portion located in the touch unit, and each first connection portion is coupled to two adjacent first touch sections in the touch unit;

in the thickness direction of the touch layer, each first connection portion is non-overlapping with all second touch sections in the touch unit.

15. The touch layer according to claim 14, wherein a first connection portion located in the touch unit is coupled to ends of two adjacent first touch sections; or the effective touch structure includes a plurality of first connection portions located in the touch unit, and a first connection portion is located between two adjacent second touch sections;

in an extending direction of a first touch section, the plurality of first connection portions are respectively arranged on two sides of a second touch section;

in an extending direction of a second touch section, the plurality of first connection portions are respectively arranged on two sides of a first touch section.

16. The touch layer according to claim 14, wherein an average value of dimensions, in a direction perpendicular to an extending direction of a first touch bar of the first touch group, of portions of the first touch bar of the first touch group is a second average width;

an average value of dimensions, in the extending direction of the first touch bar of the first touch group, of portions of a first connection portion coupled to the first touch bar of the first touch group is a third average width; and the third average width is not greater than ⅕ of the second average width; or the effective touch structure further includes at least one second connection portion, and a second connection portion is coupled to two adjacent second touch sections in the second touch group; and in the thickness direction of the touch layer, each second connection portion is non-overlapping with all first touch sections in the touch unit; or in the touch unit, a total area of all virtual touch portions is 35% to 45% of an area of the touch unit.

17. The touch layer according to claim 1, wherein a first touch bar is a metal mesh constituted by a plurality of first metal lines, and a second touch bar is a metal mesh constituted by a plurality of second metal lines;

a first metal line is perpendicular to a second metal line at a crossing position between the first touch bar and the second touch bar.

18. The touch layer according to claim 17, wherein the first metal line includes a first line segment, a second line segment and a first connection line segment that are disposed in a same layer, the first line segment and the second line segment are each substantially extend in an extending direction of the first metal line and are not located on a straight line, and two ends of the first connection line segment are respectively in contact with the first line segment and the second line segment;

the second metal line includes a third line segment, a fourth line segment and a second connection line segment that are disposed in a same layer, the third line segment and the fourth line segment are each substantially extend in an extending direction of the second metal line and are not located on a straight line, and two ends of the second connection line segment are respectively in contact with the third line segment and the fourth line segment;

the first metal line and the second metal line are located in different layers;

at the crossing position, the first line segment crosses and is perpendicular to the fourth line segment, or the first line segment crosses and is perpendicular to the third line segment.

19. The touch layer according to claim 18, wherein the first touch bar includes a plurality of first touch electrodes and a plurality of first coupling portions that are alternately arranged and coupled to one another;

a first coupling portion includes at least one coupling sub-portion, and a coupling sub-portion is coupled to two adjacent first touch electrodes;

the coupling sub-portion is in a shape of "W", and the coupling sub-portion and the second touch bar have two crossing positions therebetween.

20. A touch display apparatus, comprising a display panel and the touch layer that is according to claim 1.

* * * * *